(12) United States Patent
Furuyama

(10) Patent No.: US 8,764,124 B2
(45) Date of Patent: Jul. 1, 2014

(54) BRAKE CONTROL APPARATUS

(75) Inventor: Hiroshi Furuyama, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 485 days.

(21) Appl. No.: 13/090,545

(22) Filed: Apr. 20, 2011

(65) Prior Publication Data

US 2012/0049617 A1    Mar. 1, 2012

(30) Foreign Application Priority Data

Sep. 1, 2010  (JP) .................................. 2010-195372

(51) Int. Cl.
*B60T 13/00* (2006.01)

(52) U.S. Cl.
USPC ............. 303/9.75; 303/146; 303/177; 701/70

(58) Field of Classification Search
USPC ........ 303/9.75, 139, 146, 149, 152, 177, 183; 701/70, 82, 83, 89
See application file for complete search history.

(56) References Cited

U.S. PATENT DOCUMENTS

| | | | |
|---|---|---|---|
| 7,066,560 B2* | 6/2006 | Kato et al. ..................... | 303/140 |
| 7,222,923 B2* | 5/2007 | Banno et al. .................. | 303/169 |
| 7,392,127 B2* | 6/2008 | Kato et al. ..................... | 701/70 |
| 7,669,943 B2* | 3/2010 | Kato et al. ..................... | 303/146 |
| 2005/0159871 A1 | 7/2005 | Nakamura et al. | |

FOREIGN PATENT DOCUMENTS

JP    2005-225482 A    8/2005

* cited by examiner

*Primary Examiner* — Pamela Rodriguez
(74) *Attorney, Agent, or Firm* — Crowell & Moring LLP

(57) ABSTRACT

A brake control apparatus includes a braking force generating section and a control unit. The braking force generating section generates braking forces at wheels of a vehicle. The control unit includes: a vehicle behavior calculating section configured to calculate dynamic behavior of the vehicle, wherein the dynamic behavior includes lateral acceleration, yaw rate, and rolling behavior; a first braking force distribution calculating section configured to calculate a first setpoint of distribution of the braking forces depending on the calculated lateral acceleration and yaw rate; a second braking force distribution calculating section configured to calculate a second setpoint of distribution of the braking forces depending on the calculated rolling behavior; and a braking force distribution control section configured to select one of the first and second setpoints depending on the calculated dynamic behavior, and operate the braking force generating section with a braking force request set to the selected setpoint.

20 Claims, 9 Drawing Sheets

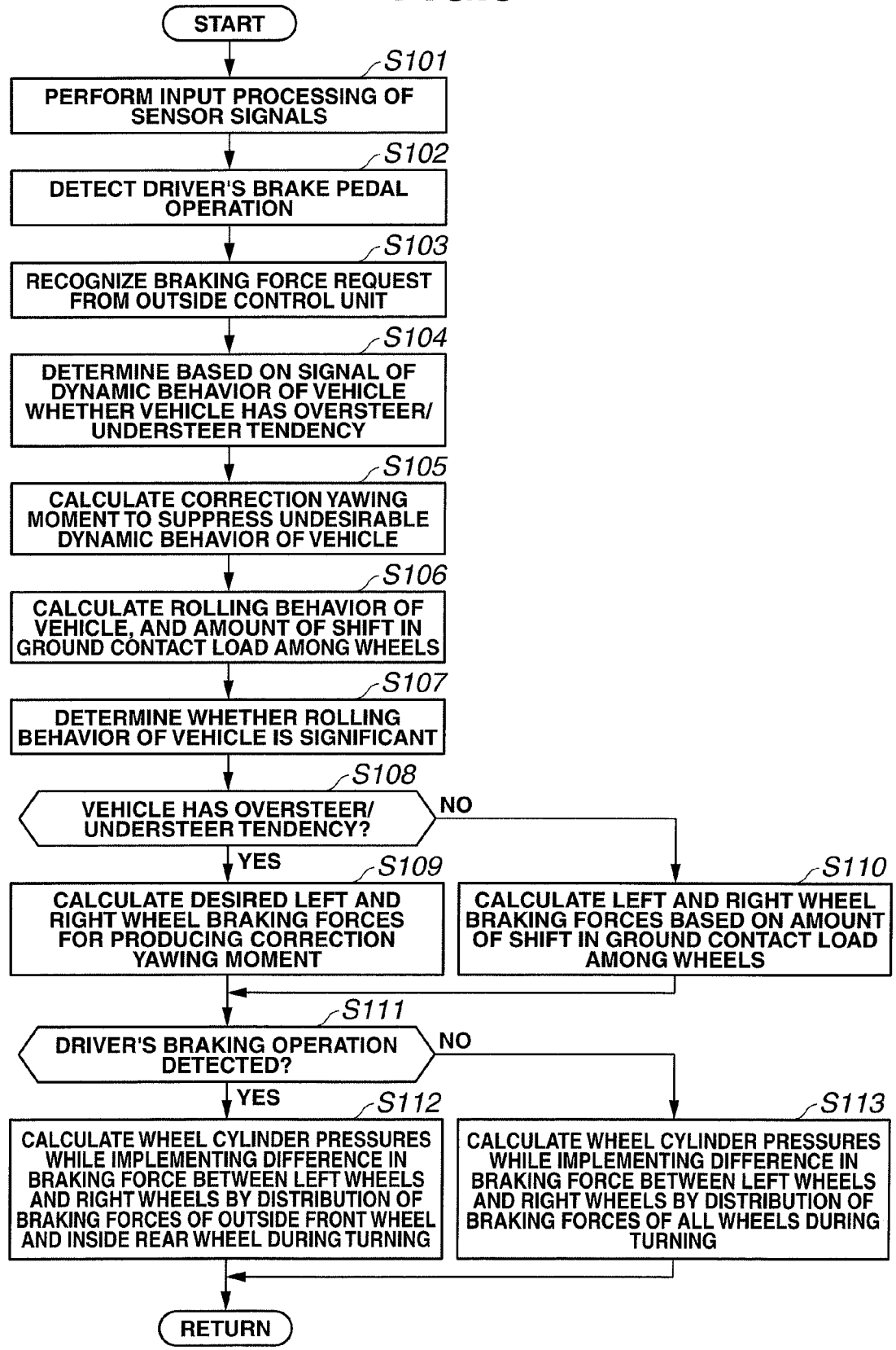

FIG.4A STEERING ANGLE

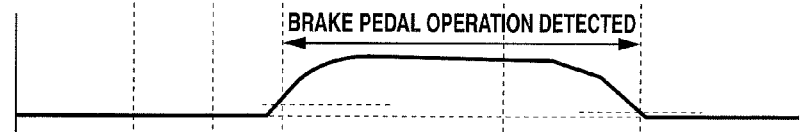
FIG.4B MASTER CYLINDER PRESSURE

FIG.4C BRAKING FORCE REQUESTED BY OUTSIDE CONTROL UNIT

FIG.4D FIRST OVERSTEER/UNDERSTEER INDICATOR (VEHICLE YAW RATE DEVIATION)

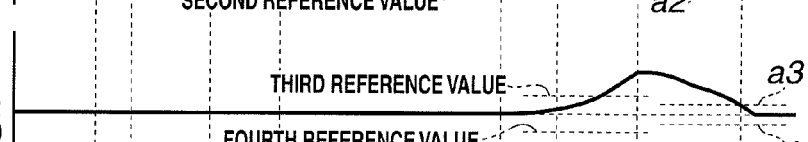
FIG.4E SECOND OVERSTEER/UNDERSTEER INDICATOR (VEHICLE SIDESLIP ANGLE)

FIG.4F CORRECTION YAWING MOMENT

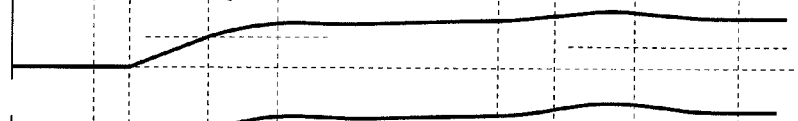
FIG.4G ROLL SIGNAL

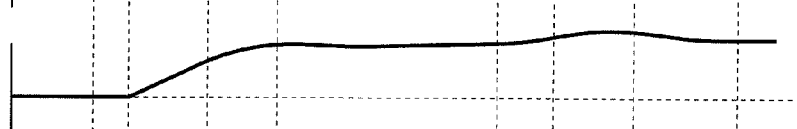
FIG.4H AMOUNT OF SHIFT IN GROUND CONTACT LOAD AMONG WHEELS

FIG.4I BRAKE FLUID PRESSURE FOR INSIDE FRONT WHEEL DURING TURNING

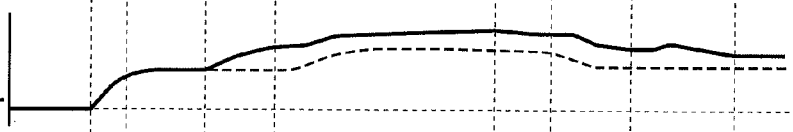
FIG.4J BRAKE FLUID PRESSURE FOR OUTSIDE FRONT WHEEL DURING TURNING

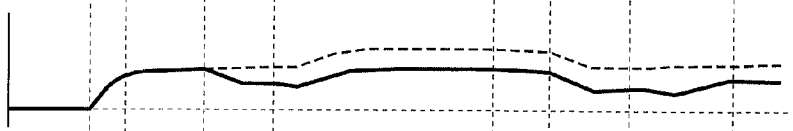
FIG.4K BRAKE FLUID PRESSURE FOR INSIDE REAR WHEEL DURING TURNING

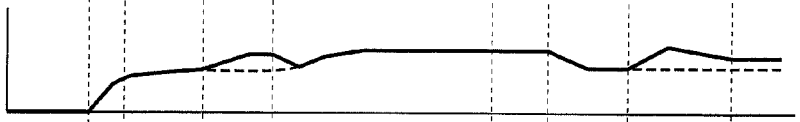
FIG.4L BRAKE FLUID PRESSURE FOR OUTSIDE REAR WHEEL DURING TURNING

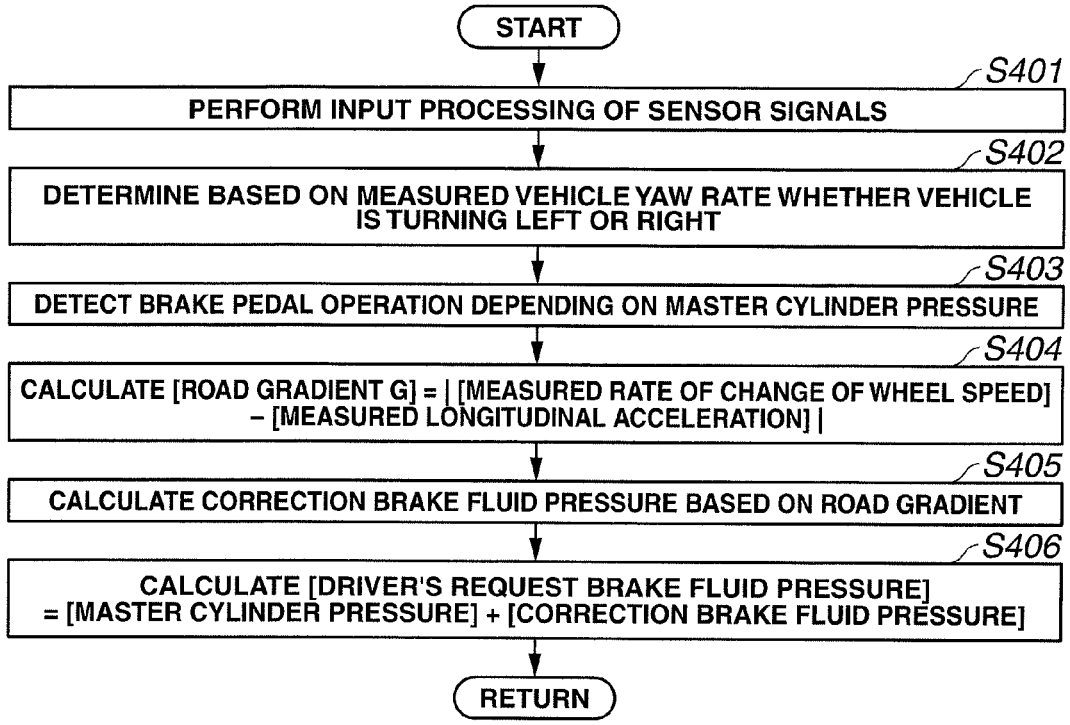
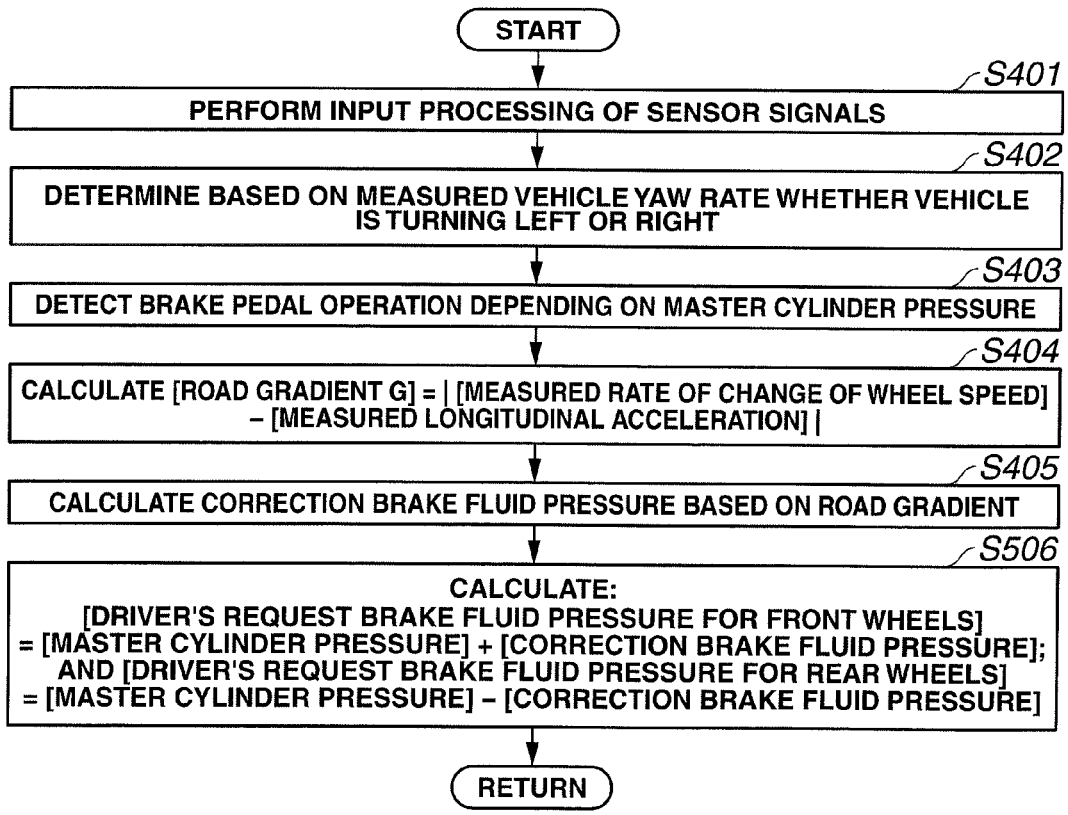

BRAKE CONTROL APPARATUS

BACKGROUND OF THE INVENTION

The present invention relates to a brake control apparatus or system for controlling wheel cylinder pressures of a vehicle.

Japanese Patent Application Publication 2005-225482 and United States Patent Application Publication 2005/0159871, which belong to the same patent family, disclose a brake control apparatus for controlling wheel cylinder pressures of a vehicle. Under a specific condition, this brake control apparatus changes braking force distribution between a set of front wheels and a set of rear wheels while maintaining a total braking force constant. In order to cancel a yawing moment resulting from this change, the brake control apparatus adjusts braking force distribution between left and right front wheels or between left and right rear wheels.

SUMMARY OF THE INVENTION

It is preferable to provide a brake control apparatus for a vehicle, which is capable of assisting braking operation with more suitable braking force distribution among road wheels, taking account of detailed information about dynamic behavior of the vehicle, for example, rolling behavior of the vehicle while the vehicle is turning.

According to one aspect of the present invention, a brake control apparatus comprises: a braking force generating section adapted to generate braking forces at left and right front road wheels and left and right rear road wheels of a vehicle in accordance with a braking force request; and a control unit connected for signal communication therewith to the braking force generating section, wherein the control unit includes: a vehicle behavior calculating section configured to calculate dynamic behavior of the vehicle, wherein the dynamic behavior includes lateral acceleration, yaw rate, and rolling behavior; a first braking force distribution calculating section configured to calculate a first setpoint of distribution of the braking forces depending on the calculated lateral acceleration and the calculated yaw rate; a second braking force distribution calculating section configured to calculate a second setpoint of distribution of the braking forces depending on the calculated rolling behavior; and a braking force distribution control section configured to perform a braking force distribution control of selecting one of the first and second setpoints depending on the calculated dynamic behavior, and operating the braking force generating section with the braking force request set to the selected setpoint.

According to another aspect of the present invention, a brake control apparatus comprises: a braking force generating section adapted to generate braking forces at left and right front road wheels and left and right rear road wheels of a vehicle in accordance with a braking force request, wherein the braking force generating section includes: a brake operation detecting section adapted to detect driver's brake operation; a first brake line connected to the right front road wheel and the left rear road wheel; and a second brake line connected to the left front road wheel and the right rear road wheel; and a control unit connected for signal communication therewith to the braking force generating section, wherein the control unit includes: a vehicle behavior calculating section configured to: calculate dynamic behavior of the vehicle, wherein the dynamic behavior includes lateral acceleration, yaw rate, and rolling behavior; and detect unstable behavior of the vehicle with reference to the calculated dynamic behavior, wherein the unstable behavior includes understeer tendency and oversteer tendency; a braking force distribution calculating section configured to calculate a setpoint of distribution of the braking forces depending on the calculated lateral acceleration, the calculated yaw rate, and the calculated rolling behavior; and a braking force distribution control section configured to perform a braking force distribution control of operating the braking force generating section with the braking force request set to the calculated setpoint; wherein the control unit is configured to perform the following when driver's brake operation is being detected by the brake operation detecting section: performing the braking force distribution control for the first brake line, and allowing brake fluid to be supplied from the master cylinder to the second brake line when the vehicle is turning left; and performing the braking force distribution control for the second brake line, and allowing brake fluid to be supplied from the master cylinder to the first brake line when the vehicle is turning right.

According to a further aspect of the present invention, a brake control apparatus comprises: a master cylinder adapted to generate brake fluid pressure in response to driver's brake operation, and generate braking forces at left and right front road wheels and left and right rear road wheels of a vehicle; a brake operation sensor adapted to detect driver's brake operation; a pump arranged to suck brake fluid from the master cylinder and supply brake fluid to the road wheels so as to generate the braking forces; a lateral acceleration sensor configured to calculate lateral acceleration of the vehicle; a yaw rate sensor configured to calculate yaw rate of the vehicle; a roll calculator configured to calculate rolling behavior of the vehicle; a vehicle behavior calculating section configured to detect unstable behavior of the vehicle at least with reference to the calculated lateral acceleration and the calculated yaw rate, wherein the unstable behavior includes understeer tendency and oversteer tendency; a first braking force distribution calculating section configured to calculate a first setpoint of distribution of the braking forces depending on the calculated lateral acceleration and the calculated yaw rate; a second braking force distribution calculating section configured to calculate a second setpoint of distribution of the braking forces depending on the calculated rolling behavior; and a braking force distribution control section configured to perform a braking force distribution control of selecting one of the first and second setpoints depending on the detected behavior of the vehicle, and operating the braking force generating section with the braking force request set to the selected setpoint; wherein the braking force distribution control section is configured to perform the following when driver's brake operation is being detected by the brake operation sensor: performing the braking force distribution control for the first brake line, and allowing brake fluid to be supplied from the master cylinder to the second brake line when the vehicle is turning left; and performing the braking force distribution control for the second brake line, and allowing brake fluid to be supplied from the master cylinder to the first brake line when the vehicle is turning right; wherein the braking force distribution control section is configured to perform the braking force distribution control for both of the first and second brake lines when no driver's brake operation is being detected by the brake operation sensor.

BRIEF DESCRIPTION OF THE DRAWINGS

FIG. 3 is a flow chart showing a process of brake assist control according to the first embodiment.

FIGS. 4A to 4L are time charts showing how the brake assist control according to the first embodiment proceeds with time.

FIG. 7 is a flow chart showing a process of brake assist control according to a fourth embodiment of the present invention.

FIG. 8 is a flow chart showing a process of brake assist control according to a fifth embodiment of the present invention.

DETAILED DESCRIPTION OF THE INVENTION

First Embodiment

Figure 1:
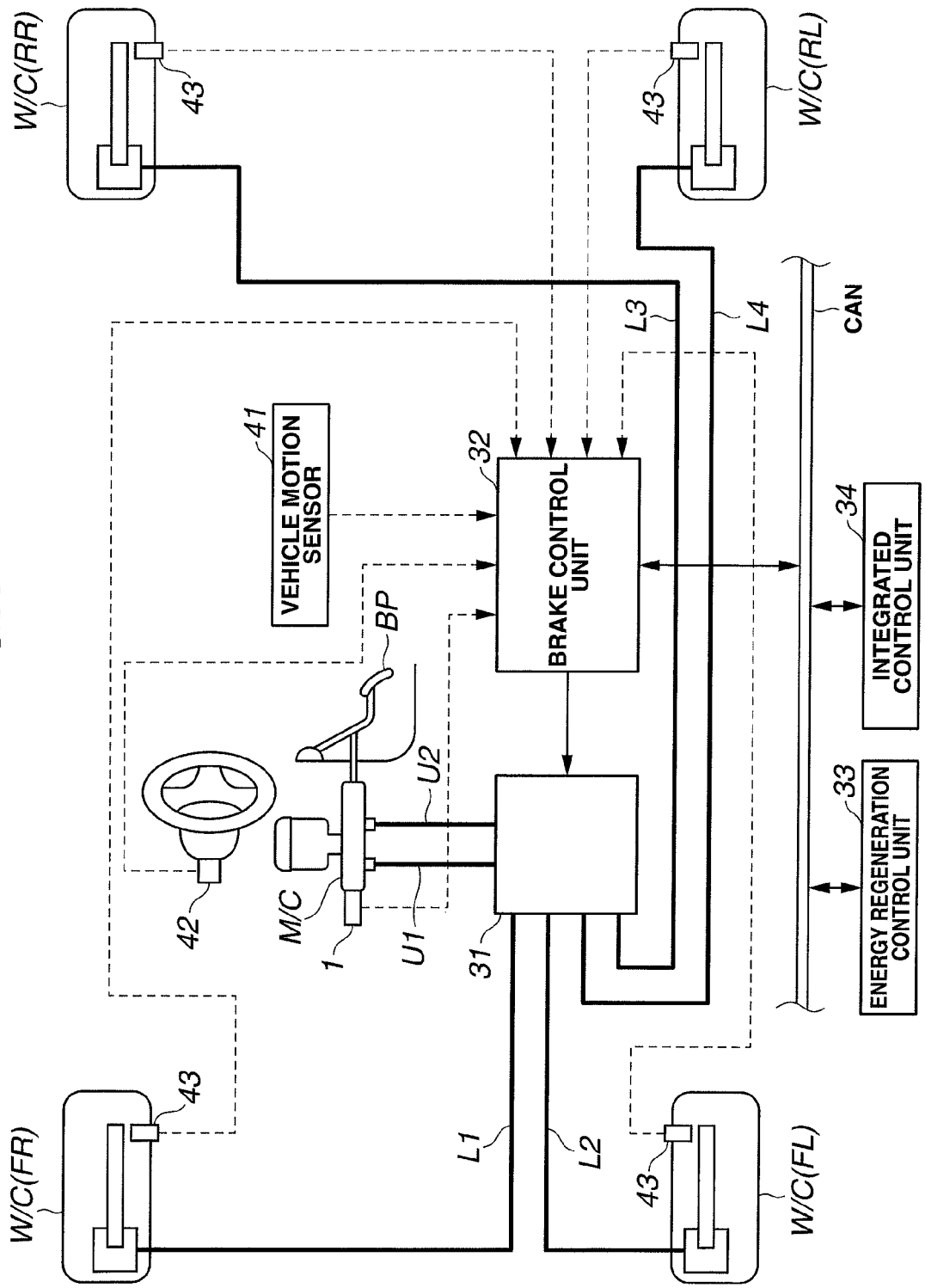
FIG. 1 is a schematic diagram showing system configuration of a motor vehicle provided with a brake control apparatus according to a first embodiment of the present invention.

FIG. 1 schematically shows system configuration of a motor vehicle provided with a brake control apparatus according to a first embodiment of the present invention. The vehicle is an electric vehicle or hybrid electric vehicle provided with a motor generator as a driving source in this example. The vehicle is also provided with a plurality of control units which are configured to control dynamic behavior of the vehicle. The control units include a brake control unit 32, an energy regeneration control unit 33, and an integrated control unit 34, which are electrically connected for signal communication therewith to each other by a common CAN communication line "CAN". These control units are configured to communicate and share sensor information and control information with each other, and control dynamic behavior of the vehicle. Integrated control unit 34 produces and controls a driving torque of the vehicle, depending on operation of an accelerator pedal, etc. Upon detection of operation of a brake pedal BP, integrated control unit 34 performs a cooperative control of hydraulic braking and regenerative braking, and outputs control signals to brake control unit 32 and energy regeneration control unit 33, so as to decelerate the vehicle as desired.

The vehicle is provided with four road wheels FL, FR, RL, RR. Each road wheel FL, FR, RL, RR is provided with a wheel cylinder W/C(FL), W/C(FR), W/C(RL), W/C(RR), and a wheel speed sensor 43. Each wheel cylinder W/C(FL), W/C(FR), W/C(RL), W/C(RR) is adapted to hydraulically brake the road wheel FL, FR, RL, RR. Each wheel speed sensor 43 is adapted to measure wheel speed of the road wheel FL, FR, RL, RR. The vehicle is further provided with a steering wheel angle sensor 42, a vehicle motion sensor 41, and a master cylinder pressure sensor 1. Steering wheel angle sensor 42 is adapted to measure or calculate steering angle of a steering wheel. Vehicle motion sensor 41 is adapted to measure or calculate dynamic behavior of the vehicle, wherein the dynamic behavior includes lateral acceleration, longitudinal acceleration, and yaw rate. Master cylinder pressure sensor 1 is adapted to measure pressure of a master cylinder "M/C", which is indicative of state or amount of operation of brake pedal BP. The amount of operation of brake pedal BP may be alternatively estimated based on a measured stroke or depressing force of brake pedal BP. The longitudinal acceleration may be replaced with an ON signal of a brake lamp switch. Brake control unit 32 is configured to calculate a desired hydraulic braking force based on the information through the CAN communication line CAN and the information from the sensors, and output to fluid pressure control unit 31 a control signal indicative of the desired hydraulic braking force.

Master cylinder M/C to which brake pedal BP is coupled is of a tandem type, and is separated into a primary cylinder chamber and a secondary cylinder chamber not shown. The primary cylinder chamber belongs to a first brake channel or brake line referred to as P-line, and is hydraulically connected to a P-line upstream pipe U1. On the other hand, the secondary cylinder chamber belongs to a second brake channel or brake line referred to as S-line, and is hydraulically connected to an S-line upstream pipe U2. P-line upstream pipe U1 and S-line upstream pipe U2 are hydraulically connected to fluid pressure control unit 31. Fluid pressure control unit 31 is hydraulically connected to wheel cylinders W/C(FL), W/C(FR), W/C(RL), W/C(RR) through downstream pipes L1, L2, L3, L4, respectively.

Figure 2:
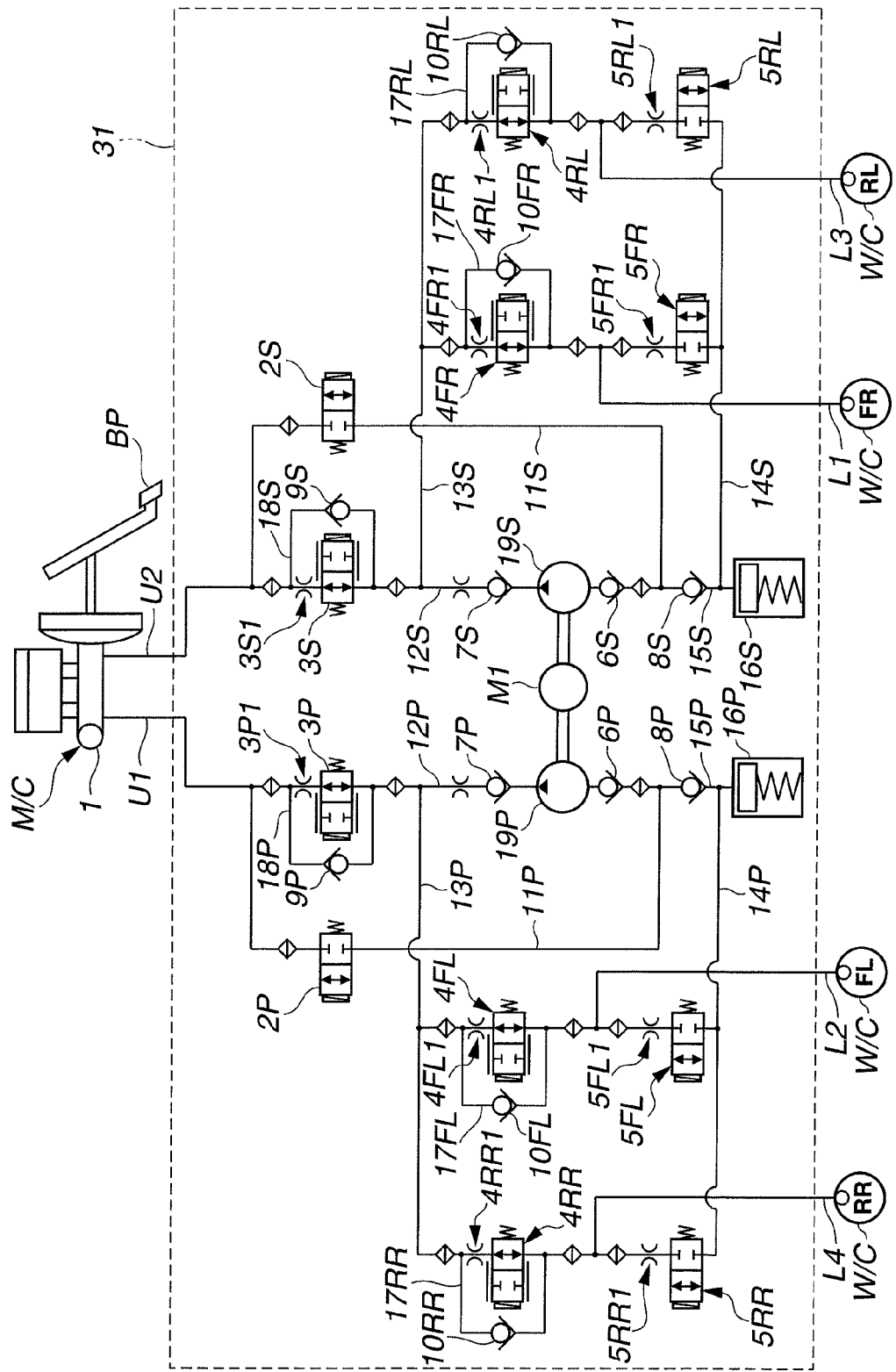
FIG. 2 is a schematic diagram showing a hydraulic circuit of a fluid pressure control unit according to the first embodiment.

<Hydraulic Circuit> FIG. 2 schematically shows a hydraulic circuit of fluid pressure control unit 31. In fluid pressure control unit 31, the P-line is connected to left front wheel cylinder W/C(FL) and right rear wheel cylinder W/C(RR), and the S-line is connected to right front wheel cylinder W/C(FR) and left rear wheel cylinder W/C(RL).

The P-line and S-line are provided with a gear pump 19P and a gear pump 19S, respectively. Gear pumps 19P, 19S are driven by an electric motor Ml. Master cylinder M/C and the suction side of each gear pump 19P, 19S are connected through a fluid passage 11P, 11S and upstream pipe U1, U2. Each fluid passage 11P, 11S is provided with a gate-in valve 2P, 2S. Each gate-in valve 2P, 2S is a normally closed electromagnetic valve. Each fluid passage 11P, 11S is also provided with a check valve 6P, 6S arranged between gate-in valve 2P, 2S and gear pump 19P, 19S. Each check valve 6P, 6S permits brake fluid to flow from gate-in valve 2P, 2S to gear pump 19P, 19S, and prevents brake fluid from flowing inversely.

The discharge side of each gear pump 19P, 19S is connected to a corresponding one of a set of wheel cylinders W/C(FL), W/C(RR) and a set of wheel cylinders W/C(FR), W/C(RL) through fluid passage 13P, 13S. Each fluid passage 13P, 13S is provided with a corresponding one of a set of solenoid in-valves 4FL, 4RR and a set of solenoid in-valves 4FR, 4RL, each of which leads to a corresponding one of wheel cylinders W/C(FL), W/C(FR), W/C(RL), W/C(RR). Each solenoid in-valve 4FL, 4FR, 4RL, 4RR is a normally open proportional control electromagnetic valve. Each fluid passage 13P, 13S is provided with a check valve 7P, 7S arranged between gear pump 19P, 19S and a corresponding one of the set of solenoid in-valves 4FL, 4RR and the set of solenoid in-valves 4FR, 4RL. Each check valve 7P, 7S permits brake fluid to flow from gear pump 19P, 19S to a corresponding one of the set of solenoid in-valves 4FL, 4RR and the set of solenoid in-valves 4FR, 4RL, and prevents brake fluid from flowing inversely.

Each fluid passage 13P, 13S is provided with a fluid passage 17FL, 17FR, 17RL, 17RR that bypasses solenoid in-valve 4FL, 4FR, 4RL, 4RR. Each fluid passage 17FL, 17FR, 17RL, 17RR is provided with a check valve 10FL, 10FR, 10RL, 10RR. Each check valve 10FL, 10FR, 10RL, 10RR permits brake fluid to flow from wheel cylinder W/C(FL), W/C(FR), W/C(RL), W/C(RR) to gear pump 19P, 19S, and prevents brake fluid from flowing inversely.

Master cylinder M/C and each fluid passage 13P, 13S are connected by a fluid passage 12P, 12S. Each fluid passage 12P, 12S is connected to fluid passage 13P, 13S at a point between gear pump 19P, 19S and a corresponding one of the set of solenoid in-valves 4FL, 4RR and the set of solenoid in-valves 4FR, 4RL. Each fluid passage 12P, 12S is provided with a gate-out valve 3P, 3S. Each gate-out valve 3P, 3S is a normally open proportional control electromagnetic valve.

Each fluid passage 12P, 12S is provided with a fluid passage 18P, 18S bypassing the gate-out valve 3P, 3S. Each fluid passage 18P, 18S is provided with a check valve 9P, 9S. Each check valve 9P, 9S permits brake fluid to flow from master cylinder M/C to a corresponding one of the set of wheel cylinders W/C(FL), W/C(RR) and the set of wheel cylinders W/C(FR), W/C(RL), and prevents brake fluid from flowing inversely.

The suction side of each gear pump 19P, 19S is provided with a reservoir 16P, 16S. Each reservoir 16P, 16S is connected to gear pump 19P, 19S through a fluid passage 15P, 15S. Each fluid passage 15P, 15S is provided with a check valve 8P, 8S between reservoir 16P, 16S and gear pump 19P, 19S. Each check valve 8P, 8S permits brake fluid to flow from reservoir 16P, 16S to gear pump 19P, 19S, and prevents brake fluid from flowing inversely. Each fluid passage 15P, 15S is hydraulically connected to a corresponding one of the set of wheel cylinders W/C(FL), W/C(RR) and the set of wheel cylinders W/C(FR), W/C(RL) through a fluid passage 14P, 14S. Each fluid passage 15P, 15S is hydraulically connected to fluid passage 14P, 14S at a point between check valve 8P, 8S and reservoir 16P, 16S. Each fluid passage 14P, 14S is provided with a corresponding one of a set of solenoid out-valves 5FL, 5RR and a set of solenoid out-valves 5FR, 5RL. Each solenoid out-valve 5FL, 5FR, 5RL, 5RR is a normally closed electromagnetic valve.

Gate-in valves 2P, 2S, gate-out valves 3P, 3S, solenoid in-valves 4FL, 4FR, 4RL, 4RR, and solenoid out-valves 5FL, 5FR, 5RL, 5RR are controlled by brake control unit 32. Brake control unit 32 is configured to perform a brake assist control for boosting braking force, an anti-skid brake control for preventing wheel lockup (antilock brake system, ABS), and a vehicle motion stabilizing control for stabilizing dynamic behavior of the vehicle (vehicle dynamics control, VDC), based on information from the other control units and sensors. Moreover, brake control unit 32 calculates a desired total braking force for control of tire slip, vehicle behavior, etc., with reference to information about inter-vehicle distance control and obstacle collision avoidance control from the other control units. Then, brake control unit 32 calculates a desired braking force of each road wheel based on the desired total braking force, and outputs control signals indicative of the braking force setpoints.

<Brake Assist Control> FIG. 3 shows a process of brake assist control according to the first embodiment. This control is repeatedly executed by brake control unit 32 at intervals of a predetermined control cycle. During the control, brake control unit 32 calculates command values, and outputs to fluid pressure control unit 31 control signals indicative of the command values.

At Step S101, brake control unit 32 performs input processing of sensor signals. The sensor signals are read after passing through a hardware-based low-pass filter. The hardware-based low-pass filter is free from aliasing noise which may be caused according to the reading cycle or sampling cycle of each control unit. The sensor signals are treated also with a software-based low-pass filter for removing interposition of vehicle body vibration, electrical noise, etc. The low-pass filters are designed with such frequency characteristics that even when the vehicle is rapidly manipulated by a driver, resultant rapid change in hydraulic pressures or resultant rapid change in vehicle dynamic behavior can be detected with high reliability.

At Step S102, among the sensor signals after the input processing, brake control unit 32 constantly monitors the signal from master cylinder pressure sensor 1, which signal serves to detect driver's brake pedal operation. Brake control unit 32 determines that driver's brake pedal operation is present, when the measured master cylinder pressure is above a predetermined reference pressure value Px. Reference pressure value Px may be set to zero, but may be preferably to a non-zero value with such a margin to prevent incorrect detection in consideration of erroneous detection of master cylinder pressure sensor 1.

At Step S103, brake control unit 32 recognizes braking force requests in the form of an equivalent master cylinder pressure, which are sent from outside control units through the CAN communication line CAN. The braking force requests may be recognized in the form of another quantity such as vehicle deceleration or vehicle braking force which may be converted to an equivalent master cylinder pressure with reference to specifications of the brake system of the vehicle. The outside control units may include a control unit for an inter-vehicle distance control system which is configured to issue a deceleration request or braking force request depending on relative speed and distance between a host vehicle and a preceding vehicle, when the inter-vehicle distance is below a predetermined reference value.

At Step S104, brake control unit 32 determines whether or not the vehicle has an oversteer tendency or an understeer tendency, depending on information about vehicle dynamic behavior after low-pass filtering, wherein the information includes wheel speed, steering angle, vehicle yaw rate, vehicle lateral acceleration, and vehicle longitudinal acceleration. This determination is implemented by first and second methods. The first method is based on vehicle yaw rate deviation. The second method is based on vehicle sideslip angle.

In the first method, brake control unit 32 calculates a steering-angle-based estimated value of vehicle yaw rate by substituting the measured steering angle into a vehicle yaw rate transfer function that is identified about the vehicle beforehand. Then, brake control unit 32 calculates a vehicle yaw rate deviation as a first oversteer/understeer indicator, which is defined as a deviation between the steering-angle-based estimated value of vehicle yaw rate and a measured value of vehicle yaw rate obtained by a yaw rate sensor. Brake control unit 32 determines that the vehicle has a tendency of oversteer, when the yaw rate deviation (first oversteer/understeer indicator) is above a predetermined first reference value and the measured yaw rate is tending to increase while the vehicle is turning left or right. On the other hand, brake control unit 32 determines that the vehicle has a tendency of understeer, when the yaw rate deviation is below a predetermined second reference value and the measured yaw rate is tending to decrease while the vehicle is turning left or right. It is noted that in this example, the yaw rate deviation is positive when the vehicle has a tendency of oversteer, and is negative when the vehicle has a tendency of understeer. The first and second reference values are provided with a hysteresis feature in such a manner that the vehicle is estimated to shift from a state of oversteer into a state of neutral steer when the yaw rate deviation falls below a predetermined reference value a1 that is smaller than the first reference value, and the vehicle is estimated to shift from a state of understeer into a state of neutral steer when the yaw rate deviation exceeds a predetermined reference value a2 that is larger than the second reference value.

In the second method based on vehicle sideslip angle, brake control unit 32 calculates vehicle speed by averaging the measured wheel speeds of the four wheels, or by adopting the measured wheel speed of a selected one of the wheels that is the n-th highest among the measured wheel speeds of the four wheels, wherein the selection is based on condition of turning and others. Then, brake control unit 32 calculates a rate of change of vehicle sideslip angle, based on the measured vehicle yaw rate, vehicle lateral acceleration and vehicle speed, using an equation of [rate of change of sideslip angle]=[yaw rate]−[lateral acceleration]/[vehicle speed]), and obtains a vehicle sideslip angle as a second oversteer/understeer indicator by integrating the rate of change of vehicle sideslip angle. Brake control unit 32 determines that the vehicle has a tendency of oversteer, when the calculated vehicle sideslip angle (second oversteer/understeer indicator) is above a predetermined third reference value. On the other hand, brake control unit 32 determines that the vehicle has a tendency of understeer, when the calculated rate of change of vehicle sideslip angle is negative and the calculated sideslip angle is below a predetermined fourth reference value. The third and fourth reference values are provided with a hysteresis feature in such a manner that the vehicle is estimated to shift from a state of oversteer into a state of neutral steer when the calculated sideslip angle falls below a predetermined reference value a3 that is smaller than the third reference value, and the vehicle is estimated to shift from a state of understeer state into a state of neutral steer when the calculated sideslip angle exceeds a predetermined reference value a4 that is larger than the fourth reference value.

At Step S105, brake control unit 32 calculates a vehicle yaw acceleration by differentiating the difference between the measured vehicle yaw rate and the steering-angle-based estimated yaw rate, and calculates a correction yawing moment by multiplying the calculated vehicle yaw acceleration by a yaw moment of inertia of the vehicle that is known from specifications of the vehicle, wherein the correction yawing moment is to suppress undesirable dynamic behavior of the vehicle.

At Step S106, brake control unit 32 estimates or calculates rolling behavior of the vehicle, and estimates or calculates an amount of shift in ground contact load among the wheels. Namely, brake control unit 32 estimates or calculates a ground contact load applied to each road wheel. A ground contact load is a load applied from the ground vertically to the wheel. This calculation is implemented as follows. The calculation of the rolling behavior is started by calculating the pitch angle and roll angle based on the measured vehicle lateral acceleration and the measured vehicle longitudinal acceleration, using a roll-pitch model that can be derived from specifications of the vehicle. The calculated pitch angle and roll angle are used to estimate or calculate ground contact loads applied to the road wheels, or change in the ground contact loads which results from the pitching and rolling motion, namely, the amount of shift in ground contact load among the wheels. Next, brake control unit 32 calculates a lateral force applied to the front road wheels and a lateral force applied to the rear road wheels, based on the measured lateral acceleration, vehicle weight, and the location of the center of mass, wherein the vehicle weight and the location of the center of mass are given from specifications of the vehicle. Moreover, brake control unit 32 calculates a total load applied to the front wheels and a total load applied to the rear wheels with reference to distribution of ground contact loads applied to the wheels under static stationary condition, using a result of calculation of ground contact loads of the road wheels which is known from the specifications of the vehicle and varies on the measured lateral acceleration and measured longitudinal acceleration, or using a ground contact load relationship among the wheels which varies according to lateral acceleration and longitudinal acceleration, wherein the wheel load relationship is obtained experimentally beforehand. Then, brake control unit 32 calculates a road surface friction coefficient based on a vector sum of the current lateral acceleration and longitudinal acceleration. Brake control unit 32 calculates reaction force capacity of the front wheel set and reaction force capacity of the rear wheel set, namely, maximum possible reaction forces applied to the front wheel set and rear wheel set, based on the lateral forces to the front wheel set and rear wheel set, the vertical loads applied to the front wheel set and rear wheel set, and the road friction coefficient. The semidiameter of the friction circle of each wheel is equivalent to the reaction force capacity or maximum possible reaction force.

At Step S107, brake control unit 32 determines whether or not the rolling behavior or motion of the vehicle is significant. First, brake control unit 32 determines whether or not the ground contact load shift calculated at Step S106 is above a predetermined fifth reference value so that the ground contact load shift may affect the stability of dynamic behavior of the vehicle. When the answer is affirmative, then brake control unit 32 determines that the rolling behavior of the vehicle is significant. This is because the ground contact load shift is caused by rolling motion of the vehicle. Next, brake control unit 32 calculates a margin factor of each wheel or wheel set that indicates a margin of reaction force with respect to the reaction force capacity or maximum possible reaction force of the wheel or wheel set. Brake control unit 32 sets a front wheel margin factor to a ratio of the reaction force capacity of the front wheels to the lateral force of the front wheels, and a rear wheel margin factor to a ratio of the reaction force capacity of the rear wheels to the lateral force of the rear wheels. When the front wheel margin factor is high, it indicates that further reaction force is possible at the front wheels. When the front wheel margin factor is low, it indicates that further reaction force is little possible at the front wheels. Similarly, when the rear wheel margin factor is high, it indicates that further reaction force is possible at the rear wheels. When the rear wheel margin factor is low, it indicates that further reaction force is little possible at the rear wheels. Brake control unit 32 determines whether or not the difference between the front wheel margin factor and the rear wheel margin factor is above a predetermined sixth reference value. Brake control unit 32 determines that the rolling motion of the vehicle is significant, when the difference between the front wheel margin factor and the rear wheel margin factor is above the sixth reference value. In addition, brake control unit 32 determines that the vehicle has an understeer tendency, when the front wheel margin factor is lower than the rear wheel margin factor by more than the sixth reference value. On the other hand, brake control unit 32 determines that the vehicle has an oversteer tendency, when the front wheel margin factor is higher than the rear wheel margin factor by more than the sixth reference value. In this way, when it is determined that the vehicle has an oversteer tendency or understeer tendency, it is determined that the rolling motion of the vehicle significant. When the margin factor of a wheel or wheel set is relatively low, it is relatively disadvantageous to distribute further braking force to the wheel, because current braking force of the wheel is close to or beyond the friction circle so that the wheel is slipping or likely to slip. On the other hand, when the margin factor of a wheel or wheel set is relatively high, it is relatively advantageous to distribute further braking force to the wheel, because current braking force of the wheel is within the friction circle so that the wheel is gripping and unlikely to slip.

In this way, the present control is started and performed before the lateral force applied to each wheel or wheel set reaches the limit of the friction circle, namely, under a condition that further reaction force of the wheel can be obtained. The method of estimating rolling behavior of the vehicle based on the wheel margin factor can be used to implement feedforward control based on estimation of vehicle dynamic behavior after pitching motion or rolling motion. This method is rational because small pitching motion or rolling motion that does not adversely affect vehicle dynamic stability makes no trouble about braking.

At Step S108, brake control unit 32 checks whether or not it is determined at Step S104 that the vehicle has an oversteer tendency or understeer tendency. When the answer to Step S108 is affirmative, the process proceeds to Step S109. On the other hand, when the answer to Step S108 is negative, the process proceeds to Step S110.

At Step S109, brake control unit 32 calculates desired left and right wheel braking forces for producing the correction yawing moment calculated at Step S105, based on the specifications of the vehicle including the position of the center of mass.

At Step S110, brake control unit 32 calculates left and right wheel braking forces based on a larger one of the braking force requests recognized at Steps S102 and S103, and based on the ground contact load shift, namely, the ratio of ground contact load of each wheel or wheel set calculated at Step S107.

At Step S111, brake control unit 32 determines whether or not driver's braking operation is detected at Step S102. When the answer to Step S111 is affirmative, the process proceeds to Step S112. On the other hand, when the answer to Step S111 is negative, the process proceeds to Step S113.

At Step S112, brake control unit 32 implements the difference in braking force between the left wheels and right wheels calculated at Step S109 or S110, by distribution of the braking forces of the outside front wheel and the inside rear wheel while the vehicle is turning. No portion of the difference is contributed by the braking forces of the inside front wheel and the outside rear wheel. In addition, the total desired braking force is distributed to all of the wheels. Finally, for each wheel, a desired wheel cylinder pressure for desired braking force is calculated based on the specifications of the brake system of the vehicle. During this operation, brake control unit 32 corrects the distribution of braking force to one of the wheels calculated at Step S110 wherein the one of the wheels is applied with a relatively high ground contact load, by increasing this distribution with reference to the ratio of ground contact road of each wheel with respect to the total ground contact load. In this way, in the case where the difference in braking force between the left wheels and right wheels is contributed by only one of the brake lines, the distribution of braking force is controlled so that the difference in braking force between the left wheel and right wheel is increased in the one of the brake lines within a range where the reaction force can be obtained, thus stabilizing the vehicle behavior.

At Step S113, brake control unit 32 implements the difference in braking force between the left wheels and right wheels calculated at Step S109 or S110, by distribution of the braking forces of the outside front wheel and the inside rear wheel, and also by distribution of the braking forces of the inside front wheel and the outside rear wheel, while the vehicle is turning. In addition, the total desired braking force is distributed to all of the wheels. For each wheel, a desired wheel cylinder pressure for desired braking force is calculated based on the specifications of the brake system of the vehicle.

FIGS. 4A to 4L shows how the brake assist control according to the first embodiment proceeds with time. In an initial state, the vehicle is traveling straight with no driver's brake operation and no driver's steering operation.

At a time instant t1, at least one of the outside control units issues a braking force request indicative of a desired braking force. In response to the braking force request, the wheel cylinder of each wheel is supplied with brake fluid pressure for producing an individual braking force to achieve the desired braking force. At this moment when the vehicle is traveling straight, the wheel cylinder of each wheel is applied with an equal brake fluid pressure. Upon receipt of the equal brake fluid pressure, the front wheels generate a larger braking force than the rear wheels, because the front wheels have larger brake capacities than the rear wheels in this example. The balance between the front wheels and the rear wheels may be adjusted differently.

At a time instant t2, the steering wheel starts to be operated by a driver. In response to this steering operation, the vehicle body starts to roll so as to shift the ground contact loads of the wheels.

At a time instant t3, the amount of ground contact load shift exceeds the fifth reference value. Accordingly, it is determined that the vehicle is making significant rolling motion. At this moment when the vehicle is in a state of neutral steer not in a state of oversteer or understeer, the braking force distribution is performed based on the ground contact load shift. Accordingly, the brake fluid pressures of the inside front and rear wheels fall by an amount, whereas the brake fluid pressures of the outside front and rear wheels increase by the amount. As a result, while the vehicle is turning, the outside wheels are applied with a relatively large braking force and the inside wheels are applied with a relatively small braking force, thus suppressing the yaw rate of the vehicle from changing or increasing. Even when the rolling motion of the vehicle is significant, this feature serves to make the dynamic behavior of the vehicle stable, and prevent further development of the rolling motion.

At a time instant t4, it is determined that driver's brake operation is present. In response to this determination, the system is shifted from a first mode to a second mode, wherein the first mode is a mode where the braking force distribution based on ground contact load shift is performed among all of the wheels, and wherein the second mode is a mode where the braking force distribution based on ground contact load shift is performed only between the outside front wheel and the inside rear wheel, namely, only for single brake line failure of the two brake lines of X-line arrangement. On the other hand, the inside front wheel and the outside rear wheel are supplied with the master cylinder pressure without control. Under this condition, when the brake pedal is operated by a driver, brake fluid is pressed out of master cylinder M/C, and thereby supplied to the inside front wheel and the outside rear wheel. This feature serves to allow a sufficient stroke of the brake pedal, and thereby prevent the driver from feeling uncomfortable due to hard feel of the brake pedal. In the first mode, braking force is automatically produced in response to a request from at least one of the outside control units, wherein gate-out valves 3P, 3S are closed, gate-in valves 2P, 2S are opened, and brake fluid is sucked from master cylinder M/C by gear pumps 19P, 19S, and supplied to upstream sides of solenoid in-valves 4FL, 4FR, 4RL, 4RR. Each solenoid in-valve 4FL, 4FR, 4RL, 4RR is set to an opening according to a braking force distribution of the corresponding wheel. If further brake fluid is supplied from the master cylinder M/C, solenoid in-valve 4FL, 4FR, 4RL, 4RR cannot supply the further brake fluid to the wheel cylinder W/C(FL), W/C(FR), W/C(RL), W/C(RR), because gate-out valves 3P, 3S are closed. This may result in insufficient stroke of the brake pedal. In the second mode, the feature that gate-out valve 3P or 3S is opened for the inside front wheel and the outside rear wheel while the vehicle is turning, serves to ensure a sufficient stroke of the brake pedal, and thereby prevent the driver from feeling uncomfortable.

At a time instant t5, the steering wheel starts to be turned by the driver in addition to the brake pedal operation. In response to this operation, the yaw rate of the vehicle starts to develop, so that the yaw rate deviation and the sideslip angle start to increase.

At a time instant t6, the yaw rate deviation exceeds the first reference value. In response to this event, it is determined that the vehicle has an oversteer tendency, and then the braking force distribution is performed in accordance with the calculated correction yawing moment. Specifically, the brake fluid pressures of the wheels other than the outside front wheel are reduced significantly so as to ensure the lateral force of each wheel, and thereby suppress the oversteer tendency. The determination that the vehicle has an oversteer tendency is maintained, when the sideslip angle exceeds the third reference value, because that determination is maintained when at least one of the first and second oversteer/understeer indicators indicates an oversteer/understeer. Similarly, the determination that the vehicle has an oversteer tendency is maintained, when the first oversteer/understeer indicator changes to indicate a neutral steer condition, as long as the second oversteer/understeer indicator continues to indicate the oversteer tendency.

At a time instant t7, it is determined that the driver stops braking operation. In response to this event, the system is shifted from the second mode to the first mode again so that the braking force distribution for producing the correction yawing moment is performed also for the inside front wheel and the outside rear wheel that have been supplied with the master cylinder pressure.

At a time instant t8, the sideslip angle falls below the reference value a3. In response to this event, it is determined that the vehicle shifts from a state of oversteer to a state of neutral steer, and then the braking force distribution is performed depending on the amount of ground contact load shift.

The brake control apparatus according to the first embodiment produces the following advantageous effects.

<1> A brake control apparatus includes: a braking force generating section (fluid pressure control unit 31) adapted to generate braking forces at left and right front road wheels (FL, FR) and left and right rear road wheels (RL, RR) of a vehicle in accordance with a braking force request; and a control unit (brake control unit 32, vehicle motion sensor 41) connected for signal communication therewith to the braking force generating section (31), wherein the control unit (32, 41) includes: a vehicle behavior calculating section (41, 32, S106) configured to calculate dynamic behavior of the vehicle, wherein the dynamic behavior includes lateral acceleration, yaw rate, and rolling behavior; a first braking force distribution calculating section (32, S109) configured to calculate a first setpoint of distribution of the braking forces depending on the calculated lateral acceleration and the calculated yaw rate; a second braking force distribution calculating section (32, S110) configured to calculate a second setpoint of distribution of the braking forces depending on the calculated rolling behavior; and a braking force distribution control section (32, S112, S113) configured to perform a braking force distribution control of selecting one of the first and second setpoints depending on the calculated dynamic behavior, and operating the braking force generating section (31) with the braking force request set to the selected setpoint. With the second braking force distribution calculating section, the brake control apparatus distributes a larger braking force to the outside wheels where the ground contact load is increased, and a smaller braking force to the inside wheels where the ground contact load is reduced. This serves to provide braking force distribution depending on the size of the friction circle of each wheel. In addition, this distribution of braking force serves to produce a yawing moment to reduce the yaw rate of the vehicle, and thereby suppress increase of the yaw rate of the vehicle in addition to suppression of the rolling motion, and thereby enhance the stability of the dynamic behavior of the vehicle while achieving the requested braking force.

<2> The brake control apparatus is configured so that: the vehicle behavior calculating section (32, S104) is configured to detect unstable behavior of the vehicle with reference to the calculated dynamic behavior, wherein the unstable behavior includes understeer tendency and oversteer tendency; and the braking force distribution control section (32, S112, S113) is configured to select one of the first and second setpoints depending on detection of the unstable behavior. The detection of oversteer tendency or understeer tendency indicates that at least one of the wheels is close to the limit of braking force. Accordingly, the feature of actively suppressing unstable vehicle behavior serves to enhance the stability of the vehicle dynamic behavior.

<3> The brake control apparatus is configured so that the braking force distribution control section (32, S112, S113) is configured to select the second setpoint in response to detection that the unstable dynamic behavior is absent and the calculated rolling behavior is above a predetermined threshold. Namely, even when rolling motion of the vehicle is detected, the braking force distribution control based on the first setpoint calculated by the first braking force distribution calculating section is selected if unstable vehicle behavior is detected. The braking force distribution control based on the second setpoint calculated by the second braking force distribution calculating section is started before the wheels start to slip excessively. Accordingly, when the wheels have already started to slip excessively, the control for suppressing unstable vehicle behavior is performed with higher priority, so that the vehicle dynamic behavior is stabilized.

<4> The brake control apparatus is configured so that: the braking force generating section (31) includes: a master cylinder (M/C) adapted to generate brake fluid pressure in response to driver's brake operation; a brake operation detecting section (1) adapted to detect driver's brake operation; a first brake line (U2, S-line) connected to the right front road wheel (FR) and the left rear road wheel (RL); and a second brake line (U1, P-line) connected to the left front road wheel (FR) and the right rear road wheel (RL); and the control unit (32, 41) is configured to perform the following when driver's brake operation is being detected by the brake operation detecting section (1): performing the braking force distribution control for the first brake line (U2), and allowing brake fluid to be supplied from the master cylinder (M/C) to the second brake line (U2) when the vehicle is turning left; and performing the braking force distribution control for the second brake line (U2), and allowing brake fluid to be supplied from the master cylinder (M/C) to the first brake line (U2) when the vehicle is turning right. This feature serves to allow a sufficient stroke of the brake pedal, and thereby prevent the driver from feeling uncomfortable due to hard feel of the brake pedal during brake pedal operation.

<5> The brake control apparatus is configured so that: the braking force generating section (31) includes a pump (gear pump 19P, 19S) arranged to suck brake fluid from the master cylinder (M/C) and supply brake fluid to the road wheels (FL, FR, RL, RR) independently of driver's brake operation; and the control unit (32, 41) is configured to perform the braking force distribution control for both of the first and second brake lines (U1, U2) when no driver's brake operation is being detected by the brake operation detecting section (1). The outside front wheel during turning is the most important of all the wheels, because this wheel is applied with the largest load of all the wheels and can produce and apply a large yawing moment to the vehicle. Accordingly, the above feature of supplying brake fluid under pressure to the brake line including the outside front wheel serves to stabilize the vehicle dynamic behavior effectively.

<6> The brake control apparatus is configured so that: the control unit (32, 41) includes: a ground contact load calculating section (32, S106) configured to calculate ground contact loads applied to the road wheels; and a total ground contact load calculating section (32, S112) configured to calculate a total ground contact load applied to the vehicle based on the calculated ground contact loads; and the control unit (32, 41) is configured to correct the second setpoint so as to increase the braking force distribution to at least one of the road wheels depending on a ratio of the ground contact load of the at least one of the road wheels with respect to the total ground contact load, wherein the ground contact load of the at least one of the road wheels is higher than that that of another one of the road wheels. Even when the braking force distribution control is performed for only one of the two brake lines, the braking force distribution to this brake line is increased within a region where reaction force can be generated, thereby ensuring a sufficient braking force.

Second Embodiment

The following describes a brake control apparatus according to a second embodiment of the present invention. The second embodiment is based on the first embodiment, and partly changed from the first embodiment as follows.

Figure 5:
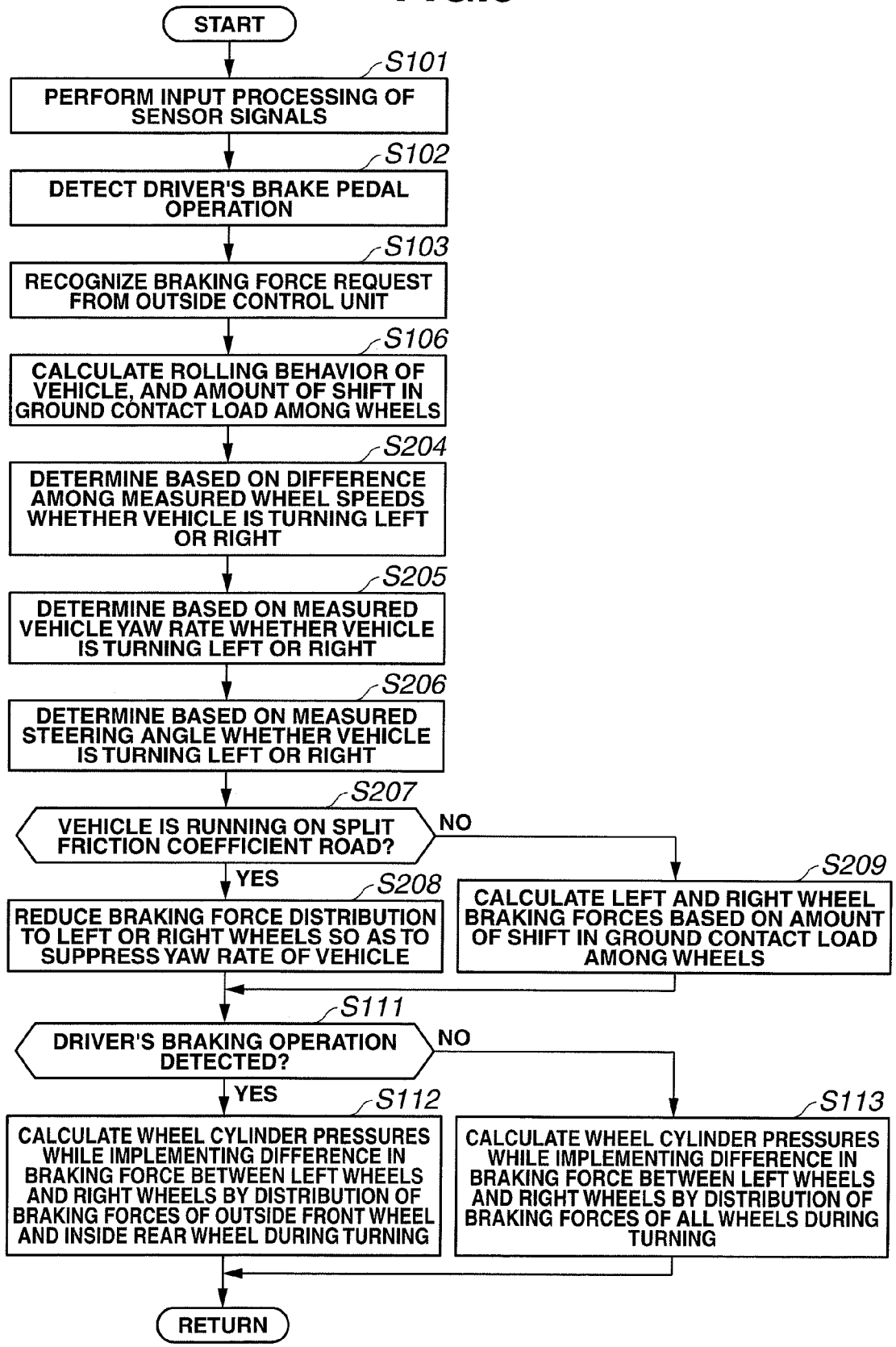
FIG. 5 is a flow chart showing a process of brake assist control according to a second embodiment of the present invention.

<Brake Assist Control> FIG. 5 shows a process of brake assist control according to the second embodiment. Steps S101 to S103, S106 and S111 to S113 are the same as in the first embodiment.

At Step S204, brake control unit 32 determines whether the vehicle is turning left or right, depending on the measured wheel speeds, namely, depending on the difference among the measured wheel speeds. When the vehicle is turning right, the left wheel speed is higher than the right wheel speed. On the other hand, when the vehicle is turning left, the right wheel speed is higher than the left wheel speed. However, situations are possible in which one of the left and right wheels is on a low friction coefficient road surface, and locked by supply of brake fluid pressure, so that the wheel speed of this wheel is low even when this wheel is an outside wheel while the vehicle is turning. The determination at Step S204 does not take into account such situations. Accordingly, the turning direction determined at Step S204 may be false.

At Step S205, brake control unit 32 determines whether the vehicle is turning left or right, depending on the measured vehicle yaw rate. Specifically, brake control unit 32 determines that the vehicle is turning right when the yaw rate is positive, and determines that the vehicle is turning left when the yaw rate is negative, for example.

At Step S206, brake control unit 32 determines whether the vehicle is turning left or right, depending on the measured steering angle.

At Step S207, brake control unit 32 determines whether or not the vehicle is running on a split friction coefficient road. When the answer to Step S207 is affirmative, then the process proceeds to Step S208. On the other hand, when the answer to Step S207 is negative, then the process proceeds to Step S209. A split friction coefficient road is a road in which left wheels are on a road section of a first friction coefficient and right wheels are on a road section of a second friction coefficient, and the first and second friction coefficients are different from each other. For example, when the vehicle is turning right under condition that the friction coefficient of the road section on a left wheel is identical to the friction coefficient of the road section on a right wheel, then the left wheel speed is higher than the right wheel speed and the difference between the left and right wheel speeds is equal to a certain value. However, if the friction coefficient of the road section on the right wheel is relatively low, the right wheel speed may significantly fall so that the left wheel speed is higher than the right wheel speed and the difference between the left and right wheel speeds exceeds the certain value even when the vehicle is traveling straight or turning left. Under this condition, the measured vehicle yaw rate may indicate left turn of the vehicle, because the vehicle is applied with a yawing moment resulting from a relatively large braking force applied to the left wheels on the high friction coefficient road section. Upon detection of unintentional left turn of the vehicle, the driver is likely to turn the steering wheel right for counter steer against the unintentional left turn. In this way, in situations where the estimated direction based on wheel speed indicates right turn, but the actual yaw rate indicates left turn, and the driver is turning the steering wheel right, it is possible to estimate that the vehicle is traveling on a split friction coefficient road.

At Step S208, brake control unit 32 reduces the braking force distribution to one of the left and right wheels so as to suppress the yaw rate of the vehicle. Specifically, since the vehicle is unintentionally turned about the wheels on the high friction coefficient road section, brake control unit 32 reduces the braking force of these wheels so as to stabilize the vehicle dynamic behavior.

At Step S209, brake control unit 32 performs braking force distribution based on ground contact load distribution, similar to Step S110 of the first embodiment.

The brake control apparatus according to the second embodiment produces the following advantageous effects.

<7> The brake control apparatus is configured so that: the control unit (32, 41) includes: a wheel speed measuring section (32, wheel speed sensor 43) configured to measure wheel speeds of the road wheels; a first turning direction calculating section (32, S204) configured to calculate depending on the measured wheel speeds a direction in which the vehicle is turning; a second turning direction calculating section (32, S205) configured to calculate the direction depending on the yaw rate; and a split road friction coefficient determining section (32, S207) configured to determine, depending on the directions calculated by the first and second turning direction calculating sections (32, S204, S205), whether or not the vehicle is traveling on a split friction coefficient road with the left road wheels on a first road surface and the right road wheels on a second road surface, wherein the first and second road surfaces have different friction coefficients; and the control unit (32) is configured to perform a first operation (S208) in response to determination that the vehicle is traveling on a split friction coefficient road while the braking force generating section (31) is being operated to generate braking forces at the road wheels with the braking force request set to the first setpoint, wherein the first operation (S208) includes: correcting the braking force distribution to the left road wheels to be smaller than that to the right road wheels when the direction calculated by the second turning direction calculating section (32, S205) is indicative of left turn of the vehicle; and correcting the braking force distribution to the right road wheels to be smaller than that to the left road wheels when the direction calculated by the second turning direction calculating section (32, S205) is indicative of right turn of the vehicle. When the wheel on the low friction coefficient road surface tends to lock while the vehicle is traveling on a split friction coefficient road, the wheel speed of the wheel on the high friction coefficient road surface is higher than the wheel speed of the wheel on the low friction coefficient road. On the other hand, the braking force of the wheel on the high friction coefficient road surface is larger than the braking force of the wheel on the low friction coefficient road surface. When the vehicle is traveling on a non-split friction coefficient road with the left and right wheels on the high friction coefficient road surface, and turning right, the wheel speed of the right wheel is lower and the wheel speed of the left wheel is higher. However, when the right wheel is slipping on a low friction coefficient road surface of a split friction coefficient road, the braking force of the left wheel is larger so that the vehicle turns left actually, although the wheel speed of the right wheel is lower and the wheel speed of the left wheel is higher. Namely, the direction estimated based on wheel speed is not identical to the direction estimated based on actual yaw rate of the vehicle. This relationship is used to determine whether or not the vehicle is traveling on a split friction coefficient road. Upon determination that the vehicle is traveling on a split friction coefficient road, the brake control apparatus reduces the braking force of the inside wheel (left wheel when the direction indicated by the measured yaw rate is left, or right wheel when the direction indicated by the measured yaw rate is right), and thereby stabilizes the vehicle dynamic behavior.

<8> The brake control apparatus is configured so that: the control unit (32, 41, 42) includes: a steering angle calculating section (steering wheel angle sensor 42) configured to calculate steering wheel angle; and a third turning direction calculating section (32, S206) configured to calculate depending on the calculated steering wheel angle the direction in which the vehicle is turning; the split road friction coefficient determining section (32, S207) is configured to determine that the vehicle is traveling on a split friction coefficient road, when the direction calculated by the first turning direction calculating section (32, S204) and the direction calculated by the third turning direction calculating section (32, S206) are different from the direction calculated by the second turning direction calculating section (32, S205). As described above, when the yaw rate of the vehicle builds up when the vehicle is being braked while the vehicle is traveling on a straight road, a driver is likely to try to stabilize the vehicle by counter steering, namely turn the steering wheel in the direction opposite to the direction of the yaw rate. This response of the driver is used to determine whether or not the vehicle is traveling on a split friction coefficient road. This features serves to implement the determination further accurately.

Third Embodiment

The following describes a brake control apparatus according to a third embodiment of the present invention. The third embodiment is based on the first embodiment, and partly changed from the first embodiment as follows.

Figure 6:
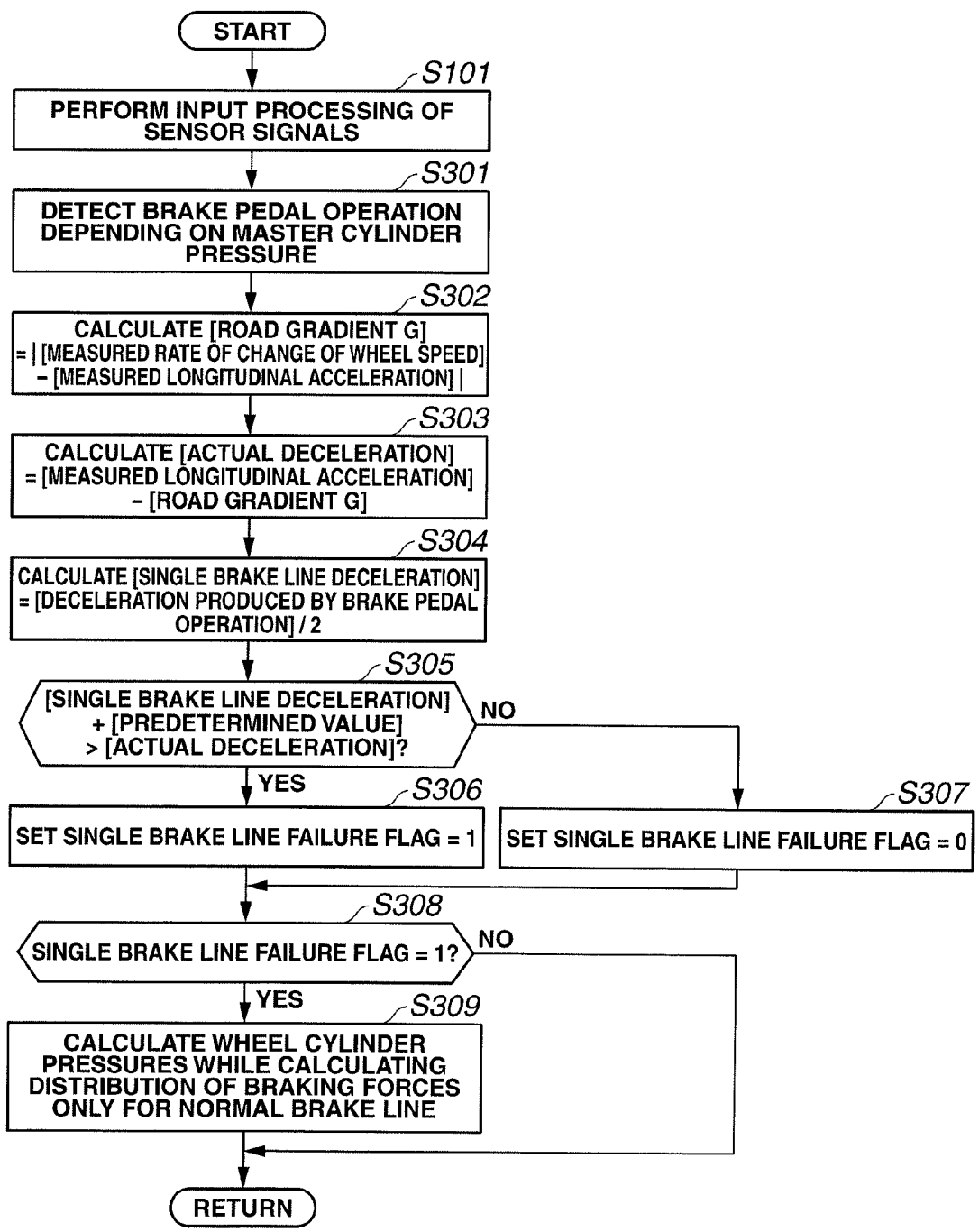
FIG. 6 is a flow chart showing a process of brake assist control according to a third embodiment of the present invention.

<Brake Assist Control> FIG. 6 shows a process of brake assist control according to the third embodiment. Step S101 is the same as in the first embodiment.

At Step S301, brake control unit 32 detects brake pedal operation depending on the master cylinder pressure. Brake control unit 32 determines that the brake pedal is operated by the driver, when the master cylinder pressure is above a predetermined threshold.

At Step S302, brake control unit 32 calculates a road gradient G by subtracting the measured longitudinal acceleration of the vehicle from the measured rate of change of wheel speed, wherein the road gradient G is an acceleration equivalent to the gradient of the road on which the vehicle is traveling.

At Step S303, brake control unit 32 calculates an actual deceleration of the vehicle by subtracting the road gradient G from the measured longitudinal acceleration.

At Step S304, brake control unit 32 calculates a desired single brake line deceleration by setting same to half of deceleration to be generated by brake pedal operation, wherein the desired single brake line deceleration is a deceleration to be generated by only one of the two brake lines.

At Step S305, brake control unit 32 determines whether or not the actual deceleration of the vehicle is below a sum of the desired single brake line deceleration and a predetermined specific value for consideration of errors. When the actual deceleration is below the sum, brake control unit 32 determines that one of the two lines is failed and the requested deceleration fails to be achieved, and then proceeds to Step S306. On the other hand, when the actual deceleration is above the sum, brake control unit 32 determines that both of the two lines are normal, and then proceeds to Step S307.

At Step S306, brake control unit 32 sets a single brake line failure flag to 1.

At Step S307, brake control unit 32 sets the single brake line failure flag to 0.

At Step S308, brake control unit 32 determines whether or not the single brake line failure flag is equal to 1. When the single brake line failure flag is equal to 1, the process proceeds to Step S309. On the other hand, when the single brake line failure flag is equal to 0, brake control unit 32 returns from this process.

At Step S309, brake control unit 32 shuts down the failed brake line, and produces braking force only with the normal brake line, because the single brake line failure flag of 1 implies the failed line and it is useless to distribute braking force to this failed line. At this moment, braking force distribution control is performed for the front and rear wheels of the normal brake line in consideration of ground contact load shift. Moreover, braking force assist control is performed to boost the master cylinder pressure, thus achieving the requested braking force. On the other hand, when both of the brake lines are normal, normal control is continued.

The brake control apparatus according to the third embodiment produces the following advantageous effects.

<9> The brake control apparatus is configured so that: the braking force generating section (31) includes: a master cylinder (M/C) adapted to generate brake fluid pressure in response to driver's brake operation; a master cylinder pressure detecting section (1) configured to detect pressure of the master cylinder (M/C); a first brake line (U2) connected to the right front road wheel (FR) and the left rear road wheel (RL); and a second brake line (U1) connected to the left front road wheel (FR) and the right rear road wheel (RL); and the control unit (32, 41) includes: a longitudinal acceleration measuring section (vehicle motion sensor 41) configured to measure longitudinal acceleration of the vehicle; an anti-skid brake control monitoring section (32, S701) configured to determine whether or not an anti-skid brake control system of the vehicle is active; a road gradient calculating section (32, S302) configured to calculate a gradient of a road on which the vehicle is traveling; and a failure determining section (32, S305) configured to calculate a differential longitudinal acceleration of the vehicle based on the measured longitudinal acceleration and the calculated gradient, and determine based on the differential longitudinal acceleration whether or not one of the first and second brake lines (U1, U2) is failed, when the anti-skid brake control system is inactive and the detected pressure is above a predetermined threshold; and the braking force distribution control section (32, S308) is configured to distribute brake fluid from the master cylinder M/C to one of the first and second brake lines (U1, U2) in response to determination that another one of the first and second brake lines (U1, U2) is failed. This feature serves to obtain a suitable braking force by stopping the braking force distribution to the failed brake line. This is effective, especially when the vehicle is traveling on a downhill road, because it is hard to apply braking force to the vehicle with brake failure.

Fourth Embodiment

The following describes a brake control apparatus according to a fourth embodiment of the present invention. The fourth embodiment is based on the first embodiment, and partly changed from the first embodiment as follows.

<Brake Assist Control> FIG. 7 shows a process of brake assist control according to the fourth embodiment. Step S401 is the same as Step S101 of the first embodiment.

At Step S402, brake control unit 32 calculates whether the vehicle is turning left or right, depending on the measured yaw rate.

At Step S403, brake control unit 32 detects brake pedal operation with reference to the master cylinder pressure.

At Step S404, brake control unit 32 calculates the road gradient G by subtracting the measured longitudinal acceleration from the rate of change of wheel speed.

At Step S405, brake control unit 32 calculates a correction brake fluid pressure depending on the road gradient. Under normal conditions, the master cylinder pressure generated by brake pedal operation can be used to estimate a braking force requested by the driver. However, when the vehicle is traveling on a downhill, the requested braking force cannot be achieved, because the vehicle is applied with an inertial force of the vehicle and thereby accelerated. The operation at Step S405 serves to achieve the requested braking force with compensation for the road gradient.

At Step S405, brake control unit 32 sets the driver's request brake fluid pressure by adding the correction brake fluid pressure to the master cylinder pressure.

The brake control apparatus according to the fourth embodiment produces the following advantageous effects.

<10> The brake control apparatus is configured so that: the control unit (32, 41) includes a road gradient calculating section (32, S404) configured to calculate a gradient of a road on which the vehicle is traveling; and the control unit (32, 41) is configured to increase the braking force request by an amount equivalent to the calculated gradient in response to a condition that the calculated gradient is indicative of a downhill. This feature serves to achieve the braking force requested by the driver, even when the vehicle is applied with an inertial force of the vehicle due to the road gradient. This may be also applied to uphill roads. Namely, the control unit (32, 41) may be configured to increase the braking force request by an amount equivalent to the calculated gradient in response to a condition that the calculated gradient is indicative of a downhill. This feature serves to prevent the vehicle from being applied with an excessive braking force, and thereby prevent the driver from feeling uncomfortable.

Fifth Embodiment

The following describes a brake control apparatus according to a fifth embodiment of the present invention. The fifth embodiment is based on the fourth embodiment, and partly changed from the fourth embodiment as follows.

<Brake Assist Control> FIG. 8 shows a process of brake assist control according to the fifth embodiment. Steps S401 to S405 are the same as in the fourth embodiment.

At Step S506, brake control unit 32 calculates the ground contact load shift, and set the driver's request brake fluid pressure for the front wheels by adding to the master cylinder pressure the correction brake fluid pressure for compensation for the road gradient, and set the driver's request brake fluid pressure for the rear wheels by subtracting the correction brake fluid pressure from the master cylinder pressure. Accordingly, even in situations where ground contact load shifts from the rear wheel side to the front wheel side due to the road gradient so that the friction circle of the front wheel is relatively large and the friction circle of the rear wheel is relatively small, it is possible to produce braking forces at both of the front and rear wheels efficiently, and thereby produce a stable total braking force.

The brake control apparatus according to the fifth embodiment produces the following advantageous effects.

<11> The brake control apparatus is configured so that: the control unit (32, 41) includes a road gradient calculating section (32, S404) configured to calculate a gradient of a road on which the vehicle is traveling; and the control unit (32, 41) is configured to increase the braking force request for the front wheels by an amount equivalent to the calculated gradient in response to a condition that the calculated gradient is indicative of a downhill; and reduce the braking force request for the rear wheels by an amount equivalent to the calculated gradient in response to a condition that the calculated gradient is indicative of a downhill. This feature serves to achieve a suitable braking force in consideration of ground contact load shift, even when ground contact load shifts forward due to the road gradient, and stabilize the vehicle dynamic behavior. As in the fourth embodiment, this may be also applied to uphill roads. Namely, when the vehicle is traveling on an uphill, brake control unit 32 may set the rear wheel braking force request by adding the road gradient correction value, and set the front wheel braking force request by subtracting the road gradient correction value. In this case, both of the amount added to the rear wheel side and the amount corresponding to the road gradient are subtracted from the base braking force of the front wheel.

Sixth Embodiment

The following describes a brake control apparatus according to a sixth embodiment of the present invention. The sixth embodiment is based on the first embodiment, and partly changed from the first embodiment as follows.

Figure 9:
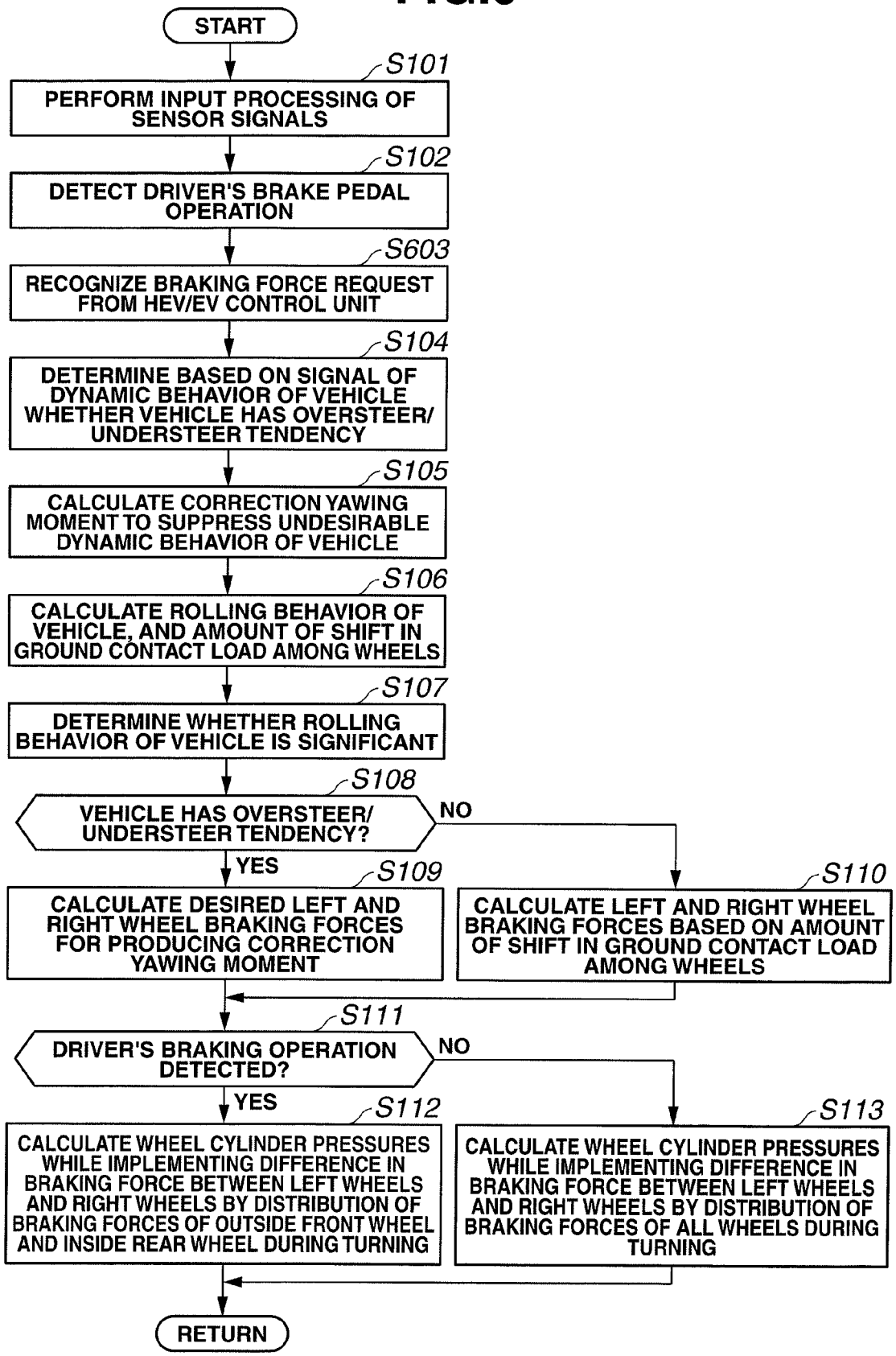
FIG. 9 is a flow chart showing a process of brake assist control according to a sixth embodiment of the present invention.

<Brake Assist Control> FIG. 9 shows a process of brake assist control according to the sixth embodiment. In the first embodiment, the control is performed in response to a request of braking force from outside control units, such as a control unit of an inter-vehicle distance control system. In contrast, in the sixth embodiment, the control is performed in response to a request of braking force from a hybrid control unit for an electric vehicle or hybrid electric vehicle.

For calculation of vehicle behavior or ground contact load shift, it is necessary to recognize a total braking force applied to the vehicle. In situations where a regenerative braking force is generated, it is also necessary to recognize this regenerative braking force. Accordingly, brake control unit 32 calculates vehicle behavior and ground contact load shift depending on the sum of the braking force based on the hydraulic brake system and the braking force based on the regenerative brake system, and calculates desired brake fluid pressures depending on the ground contact load shift and regenerative braking force. In this way, the brake control apparatus according to the sixth embodiment can supply suitable brake fluid pressures in conformance with the braking state of the vehicle.

Seventh Embodiment

The following describes a brake control apparatus according to a seventh embodiment of the present invention. The seventh embodiment is based on the first embodiment, and partly changed from the first embodiment as follows.

Figure 10:
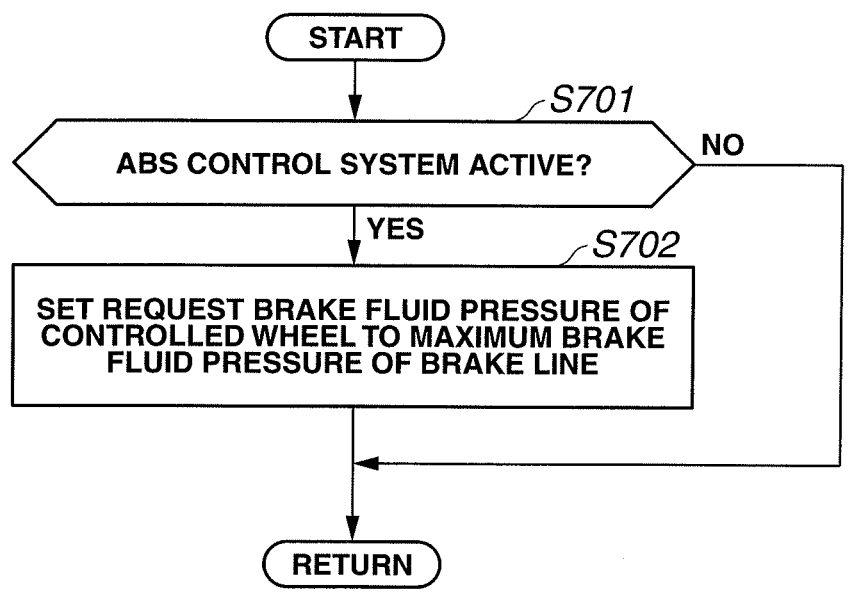
FIG. 10 is a flow chart showing a process of brake assist control according to a seventh embodiment of the present invention.

<Brake Assist Control> FIG. 10 shows a process of brake assist control according to the seventh embodiment. This process is performed for check, after the process according to the first embodiment is performed for calculating braking force distribution, etc. depending on the ground contact load shift.

At Step S701, brake control unit 32 determines whether or not the anti-skid brake control system (ABS control system) is active. When the anti-skid brake control system is active, then the process proceeds to Step S702. On the other hand, when the anti-skid brake control system is inactive, then the process returns from this process so that the braking force distribution calculated by the process according to the first embodiment is implemented with no effect of the process according to the seventh embodiment.

At Step S702, brake control unit 32 sets the request brake fluid pressure of each wheel to a maximum one of the brake fluid pressures of the wheels of the brake line to which the each wheel belongs, wherein the wheel is under control of the ABS system. Brake control unit 32 may set the request brake fluid pressure of the wheel to a predetermined maximum setpoint of the wheel or of the brake line to which the wheel belongs.

According to the first embodiment, the braking force of each wheel is controlled within its friction circle so as to prevent the wheel from being applied with an excessive braking force. This control is started before the limit of reaction force of each tire is reached, namely, even when a braking force is being generated close to the edge of the friction circle. On the other hand, the anti-skid brake control is activated in response to slippage of at lease one of the wheels. After the anti-skid brake control is activated, the brake fluid pressure is first released to prevent excessive slippage of the wheel, and then the brake fluid pressure is increased again to cause slight slippage of the wheel intentionally. The anti-skid brake control repeats pressure increase and pressure reduction, thereby maintaining the braking force maximized with respect to the road friction coefficient, while maintaining the cornering force. Therefore, for the anti-skid brake control to achieve the maximum braking force, it is necessary to permit the braking force to exceed the edge of the friction circle at least temporarily.

It is supposed that while the braking force distribution control is being performed depending on the ground contact load shift, an excessive slippage occurs at the inside rear wheel during turning so that the anti-skid brake control is activated. However, the inside rear wheel is a wheel at which the ground contact load falls most significantly of all the wheels, and thereby the braking force distribution to the inside rear wheel is relatively small. In this situation, the anti-skid brake control system may fail to increase the braking force of the inside rear wheel and make slight slippage of the inside rear wheel, and thereby fail to suitably execute the control process, and fail to produce a sufficient braking force. This potential problem is solved by the process according to the seventh embodiment by distributing the same fluid pressure to the outside front wheel and the inside rear wheel while the anti-skid brake control is active. The outside front wheel is a wheel to which a large braking force distribution is applied and a large amount of brake fluid is supplied. Accordingly, it is possible to generate a sufficient brake fluid pressure also at the inside rear wheel by the process according to the seventh embodiment, and thereby allow the anti-skid brake control system to produce a suitable braking force. It is preferable to reduce the braking force distribution to the outside front wheel by an amount corresponding to the increase in the braking force of the inside rear wheel, so as to conform the total braking force to the requested braking force.

The brake control apparatus according to the seventh embodiment produces the following advantageous effects.

<12> The brake control apparatus is configured so that: the braking force generating section (31) includes: a first brake line (U2) connected to the right front road wheel (FR) and the left rear road wheel (RL); and a second brake line (U1) connected to the left front road wheel (FR) and the right rear road wheel (RL); the control unit (32, 41) includes: an anti-skid brake control section (32) configured to prevent lock of the road wheels by repeatedly reducing, holding, and increasing wheel cylinder pressures of the road wheels in response to detection of locking tendency of the road wheels; and an anti-skid brake control monitoring section (32, S701) configured to determine whether or not an anti-skid brake control system of the vehicle is active; and the control unit (32, 41) is configured to set a desired wheel cylinder pressure of at least one of the road wheels to a maximum wheel cylinder pressure of the at least one of the road wheels or of one of the first and second brake lines to which the at least one of the road wheels is connected, in response to determination that the anti-skid brake control system is active while the braking force distributing control is being performed, wherein the at least one of the road wheels is under control of the anti-skid brake control system. This feature prevents that only a small braking force is distributed to a wheel while the anti-skid brake control is active, and permits the anti-skid brake control system to repeat pressure increase and pressure reduction, thereby maintaining the braking force maximized with respect to the road friction coefficient.

The entire contents of Japanese Patent Application 2010-195372 filed Sep. 1, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake control apparatus comprising:
a braking force generating section adapted to generate braking forces at left and right front road wheels and left and right rear road wheels of a vehicle in accordance with a braking force request; and
a control unit connected for signal communication therewith to the braking force generating section, wherein the control unit includes:
a vehicle behavior calculating section configured to calculate dynamic behavior of the vehicle, wherein the calculated dynamic behavior includes a calculated lateral acceleration, a calculated yaw rate, and a calculated rolling behavior;
a first braking force distribution calculating section configured to calculate a first setpoint of distribution of the braking forces depending on the calculated lateral acceleration and the calculated yaw rate;
a second braking force distribution calculating section configured to calculate a second setpoint of distribution of the braking forces depending on the calculated rolling behavior; and
a braking force distribution control section configured to perform a braking force distribution control of selecting one of the first and second setpoints depending on the calculated dynamic behavior, and operating the braking force generating section with the braking force request set to the selected setpoint.

2. The brake control apparatus as claimed in claim 1, wherein:
the vehicle behavior calculating section is configured to detect unstable behavior of the vehicle with reference to the calculated dynamic behavior, wherein the unstable behavior includes understeer tendency and oversteer tendency; and
the braking force distribution control section is configured to select one of the first and second setpoints depending on detection of the unstable behavior.

3. The brake control apparatus as claimed in claim 2, wherein the braking force distribution control section is configured to select the second setpoint in response to detection that the unstable behavior is absent and the calculated rolling behavior is above a predetermined threshold.

4. The brake control apparatus as claimed in claim 1, wherein:
the braking force generating section includes:
a master cylinder adapted to generate brake fluid pressure in response to driver's brake operation;
a brake operation detecting section adapted to detect driver's brake operation;
a first brake line connected to the right front road wheel and the left rear road wheel; and
a second brake line connected to the left front road wheel and the right rear road wheel; and
the control unit is configured to perform the following when driver's brake operation is being detected by the brake operation detecting section:
performing the braking force distribution control for the first brake line, and allowing brake fluid to be supplied from the master cylinder to the second brake line when the vehicle is turning left; and
performing the braking force distribution control for the second brake line, and allowing brake fluid to be supplied from the master cylinder to the first brake line when the vehicle is turning right.

5. The brake control apparatus as claimed in claim 4, wherein:
the braking force generating section includes a pump arranged to suck brake fluid from the master cylinder and supply brake fluid to the road wheels independently of driver's brake operation; and
the control unit is configured to perform the braking force distribution control for both of the first and second brake lines when no driver's brake operation is being detected by the brake operation detecting section.

6. The brake control apparatus as claimed in claim 1, wherein:
the braking force generating section includes:
a master cylinder adapted to generate brake fluid pressure in response to driver's brake operation;
a master cylinder pressure detecting section configured to detect pressure of the master cylinder;
a first brake line connected to the right front road wheel and the left rear road wheel; and
a second brake line connected to the left front road wheel and the right rear road wheel; and
the control unit includes:
a longitudinal acceleration measuring section configured to measure longitudinal acceleration of the vehicle;
an anti-skid brake control monitoring section configured to determine whether or not an anti-skid brake control system of the vehicle is active;
a road gradient calculating section configured to calculate a gradient of a road on which the vehicle is traveling; and
a failure determining section configured to calculate a differential longitudinal acceleration of the vehicle based on the measured longitudinal acceleration and the calculated gradient, and determine based on the differential longitudinal acceleration whether or not one of the first and second brake lines is failed, when the anti-skid brake control system is inactive and the detected pressure is above a predetermined threshold; and
the braking force distribution control section is configured to distribute brake fluid from the master cylinder to one of the first and second brake lines in response to determination that another one of the first and second brake lines is failed.

7. The brake control apparatus as claimed in claim 1, wherein:
the control unit includes:
a wheel speed measuring section configured to measure wheel speeds of the road wheels;
a first turning direction calculating section configured to calculate depending on the measured wheel speeds a direction in which the vehicle is turning;
a second turning direction calculating section configured to calculate the direction depending on the calculated yaw rate; and
a split road friction coefficient determining section configured to determine, depending on the directions calculated by the first and second turning direction calculating sections, whether or not the vehicle is traveling on a split friction coefficient road with the left road wheels on a first road surface and the right road wheels on a second road surface, wherein the first and second road surfaces have different friction coefficients; and
the control unit is configured to perform a first operation in response to determination that the vehicle is traveling on a split friction coefficient road while the braking force generating section is being operated to generate braking forces at the road wheels with the braking force request set to the first setpoint, wherein the first operation includes:
  correcting the braking force distribution to the left road wheels to be smaller than that to the right road wheels when the direction calculated by the second turning direction calculating section is indicative of left turn of the vehicle; and
  correcting the braking force distribution to the right road wheels to be smaller than that to the left road wheels when the direction calculated by the second turning direction calculating section is indicative of right turn of the vehicle.

8. The brake control apparatus as claimed in claim 7, wherein:
  the control unit includes:
    a steering angle calculating section configured to calculate steering wheel angle; and
    a third turning direction calculating section configured to calculate depending on the calculated steering wheel angle the direction in which the vehicle is turning;
  the split road friction coefficient determining section is configured to determine that the vehicle is traveling on a split friction coefficient road, when the direction calculated by the first turning direction calculating section and the direction calculated by the third turning direction calculating section are different from the direction calculated by the second turning direction calculating section.

9. The brake control apparatus as claimed in claim 1, wherein:
  the control unit includes a road gradient calculating section configured to calculate a gradient of a road on which the vehicle is traveling; and
  the control unit is configured to:
    reduce the braking force request by an amount equivalent to the calculated gradient in response to a condition that the calculated gradient is indicative of an uphill; and
    increase the braking force request by an amount equivalent to the calculated gradient in response to a condition that the calculated gradient is indicative of a downhill.

10. The brake control apparatus as claimed in claim 1, wherein:
  the control unit includes:
    a ground contact load calculating section configured to calculate ground contact loads applied to the road wheels; and
    a total ground contact load calculating section configured to calculate a total ground contact load applied to the vehicle based on the calculated ground contact loads; and
  the control unit is configured to correct the second setpoint so as to increase the braking force distribution to at least one of the road wheels depending on a ratio of the ground contact load of the at least one of the road wheels with respect to the total ground contact load, wherein the ground contact load of the at least one of the road wheels is higher than that that of another one of the road wheels.

11. The brake control apparatus as claimed in claim 1, wherein:
  the braking force generating section includes:
    a first brake line connected to the right front road wheel and the left rear road wheel; and
    a second brake line connected to the left front road wheel and the right rear road wheel;
  the control unit includes:
    an anti-skid brake control section configured to prevent lock of the road wheels by repeatedly reducing, holding, and increasing wheel cylinder pressures of the road wheels in response to detection of locking tendency of the road wheels; and
    an anti-skid brake control monitoring section configured to determine whether or not an anti-skid brake control system of the vehicle is active; and
  the control unit is configured to set a desired wheel cylinder pressure of at least one of the road wheels to a maximum wheel cylinder pressure of the at least one of the road wheels, in response to determination that the anti-skid brake control system is active while the braking force distributing control is being performed, wherein the at least one of the road wheels is under control of the anti-skid brake control system.

12. A brake control apparatus comprising:
  a braking force generating section adapted to generate braking forces at left and right front road wheels and left and right rear road wheels of a vehicle in accordance with a braking force request, wherein the braking force generating section includes:
    a brake operation detecting section adapted to detect driver's brake operation;
    a first brake line connected to the right front road wheel and the left rear road wheel; and
    a second brake line connected to the left front road wheel and the right rear road wheel; and
  a control unit connected for signal communication therewith to the braking force generating section, wherein the control unit includes:
    a vehicle behavior calculating section configured to:
      calculate dynamic behavior of the vehicle, wherein the calculated dynamic behavior includes a calculated lateral acceleration, a calculated yaw rate, and a calculated rolling behavior; and
      detect unstable behavior of the vehicle with reference to the calculated dynamic behavior, wherein the unstable behavior includes understeer tendency and oversteer tendency;
    a braking force distribution calculating section configured to calculate a setpoint of distribution of the braking forces depending on the calculated lateral acceleration, the calculated yaw rate, and the calculated rolling behavior; and
    a braking force distribution control section configured to perform a braking force distribution control of operating the braking force generating section with the braking force request set to the calculated setpoint;
  wherein the control unit is configured to perform the following when driver's brake operation is being detected by the brake operation detecting section:
    performing the braking force distribution control for the first brake line, and allowing brake fluid to be supplied from the master cylinder to the second brake line when the vehicle is turning left; and
    performing the braking force distribution control for the second brake line, and allowing brake fluid to be supplied from the master cylinder to the first brake line when the vehicle is turning right.

13. The brake control apparatus as claimed in claim 12, wherein the braking force distribution calculating section includes:

a first braking force distribution calculating section configured to calculate a first setpoint of distribution of the braking forces depending on the calculated lateral acceleration and the calculated yaw rate;
a second braking force distribution calculating section configured to calculate a second setpoint of distribution of the braking forces depending on the calculated rolling behavior; and
the braking force distribution control section configured to perform the braking force distribution control by selecting one of the first and second setpoints depending on the calculated dynamic behavior, and operating the braking force generating section with the braking force request set to the selected setpoint.

14. The brake control apparatus as claimed in claim 13, wherein the braking force distribution control section is configured to select the second setpoint in response to detection that the unstable dynamic behavior is absent and the calculated rolling behavior is above a predetermined threshold.

15. The brake control apparatus as claimed in claim 12, wherein:
the braking force generating section includes a pump arranged to suck brake fluid from the master cylinder and supply brake fluid to the road wheels independently of driver's brake operation; and
the control unit is configured to perform the braking force distribution control for both of the first and second brake lines when no driver's brake operation is being detected by the brake operation detecting section.

16. The brake control apparatus as claimed in claim 15, wherein:
the braking force generating section includes:
a master cylinder adapted to generate brake fluid pressure in response to driver's brake operation; and
a master cylinder pressure detecting section configured to detect pressure of the master cylinder;
the control unit includes:
an anti-skid brake control section configured to prevent lock of the road wheels by repeatedly reducing, holding, and increasing wheel cylinder pressures of the road wheels in response to detection of locking tendency of the road wheels; and
an anti-skid brake control monitoring section configured to determine whether or not an anti-skid brake control system of the vehicle is active; and
the control unit is configured to perform the following in response to determination that the anti-skid brake control system is active while the braking force distributing control is being performed:
setting a desired wheel cylinder pressure of at least one of the road wheels to a maximum wheel cylinder pressure of the at least one of the road wheels or of one of the first and second brake lines to which the at least one of the road wheels is connected, wherein the at least one of the road wheels is under control of the anti-skid brake control system; and
reducing a difference between the desired wheel cylinder pressure and the detected pressure of the master cylinder.

17. The brake control apparatus as claimed in claim 16, wherein:
the control unit includes a road gradient calculating section configured to calculate a gradient of a road on which the vehicle is traveling; and
the control unit is configured to:
reduce the braking force request by an amount equivalent to the calculated gradient in response to a condition that the calculated gradient is indicative of an uphill; and
increase the braking force request by an amount equivalent to the calculated gradient in response to a condition that the calculated gradient is indicative of a downhill.

18. The brake control apparatus as claimed in claim 17, wherein:
the control unit includes:
a ground contact load calculating section configured to calculate ground contact loads applied to the road wheels; and
a total ground contact load calculating section configured to calculate a total ground contact load applied to the vehicle based on the calculated ground contact loads; and
the control unit is configured to correct the second setpoint so as to increase the braking force distribution to at least one of the road wheels depending on a ratio of the ground contact load of the at least one of the road wheels with respect to the total ground contact load, wherein the ground contact load of the at least one of the road wheels is higher than that that of another one of the road wheels.

19. The brake control apparatus as claimed in claim 12, wherein:
the braking force generating section includes:
a master cylinder adapted to generate brake fluid pressure in response to driver's brake operation;
a master cylinder pressure detecting section configured to detect pressure of the master cylinder; and
the control unit includes:
a longitudinal acceleration measuring section configured to measure longitudinal acceleration of the vehicle;
an anti-skid brake control monitoring section configured to determine whether or not an anti-skid brake control system of the vehicle is active;
a road gradient calculating section configured to calculate a gradient of a road on which the vehicle is traveling; and
a failure determining section configured to calculate a differential longitudinal acceleration of the vehicle based on the measured longitudinal acceleration and the calculated gradient, and determine based on the differential longitudinal acceleration whether or not one of the first and second brake lines is failed, when the anti-skid brake control system is inactive and the detected pressure is above a predetermined threshold; and
the braking force distribution control section is configured to distribute brake fluid from the master cylinder to one of the first and second brake lines in response to determination that another one of the first and second brake lines is failed.

20. A brake control apparatus comprising:
a master cylinder adapted to generate brake fluid pressure in response to driver's brake operation, and generate braking forces at left and right front road wheels and left and right rear road wheels of a vehicle;
a brake operation sensor adapted to detect driver's brake operation;
a pump arranged to suck brake fluid from the master cylinder and supply brake fluid to the road wheels so as to generate the braking forces;

a first brake line connected to the right front road wheel and to the left rear road wheel;

a second brake line connected to the left front road wheel and to the right rear road wheel;

a lateral acceleration sensor configured to calculate lateral acceleration of the vehicle;

a yaw rate sensor configured to calculate yaw rate of the vehicle;

a roll calculator configured to calculate rolling behavior of the vehicle;

a vehicle behavior calculating section configured to detect unstable behavior of the vehicle at least with reference to the calculated lateral acceleration and the calculated yaw rate, wherein the unstable behavior includes understeer tendency and oversteer tendency;

a first braking force distribution calculating section configured to calculate a first setpoint of distribution of the braking forces depending on the calculated lateral acceleration and the calculated yaw rate;

a second braking force distribution calculating section configured to calculate a second setpoint of distribution of the braking forces depending on the calculated rolling behavior; and a braking force distribution control section configured to perform a braking force distribution control of selecting one of the first and second setpoints depending on the detected behavior of the vehicle, and controlling the braking forces based on the selected setpoint;

wherein the braking force distribution control section is configured to perform the following when driver's brake operation is being detected by the brake operation sensor:

performing the braking force distribution control for the first brake line, and allowing brake fluid to be supplied from the master cylinder to the second brake line when the vehicle is turning left; and performing the braking force distribution control for the second brake line, and allowing brake fluid to be supplied from the master cylinder to the first brake line when the vehicle is turning right;

wherein the braking force distribution control section is configured to perform the braking force distribution control for both of the first and second brake lines when no driver's brake operation is being detected by the brake operation sensor.

* * * * *